United States Patent
Martin et al.

(10) Patent No.: US 6,857,572 B2
(45) Date of Patent: Feb. 22, 2005

(54) AUTOMATICALLY-ACTIVATED HAND-SUPPORTABLE LASER SCANNING BAR CODE SYMBOL READING SYSTEM WITH OMNIDIRECTIONAL AND UNIDIRECTIONAL SCANNING MODES IN ADDITION TO A DATA TRANSMISSION ACTIVATION SWITCH

(75) Inventors: William Martin, Clementon, NJ (US); David M. Wilz, Sr., Sewell, NJ (US); Sergio Movsessian, Flourtown, PA (US); Thomas Amundsen, Turnersville, NJ (US); Patrick A. Giordano, Blackwood, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 10/014,342

(22) Filed: Nov. 13, 2001

(65) Prior Publication Data

US 2002/0104886 A1 Aug. 8, 2002

Related U.S. Application Data

(63) Continuation-in-part of application No. 09/204,176, filed on Dec. 3, 1998, now Pat. No. 6,283,375, and a continuation-in-part of application No. 09/452,976, filed on Dec. 2, 1999.

(51) Int. Cl.[7] ................................................ G06K 7/10
(52) U.S. Cl. .......................... 235/462.45; 235/462.48
(58) Field of Search ...................... 235/462.01, 462.14, 235/462.25, 462.3, 462.31, 462.32, 462.33, 462.35, 462.36, 462.43, 462.45, 462.46, 462.48, 472.01, 472.02, 454, 462.09, 473

(56) References Cited

U.S. PATENT DOCUMENTS 3,911,270 A * 10/1975 Traub ...................... 235/473 X
4,465,926 A * 8/1984 Apitz et al. ............. 235/462.49
4,639,606 A    1/1987 Boles et al.
5,132,523 A * 7/1992 Bassett ................... 235/462.45
5,148,008 A    9/1992 Takenaka
5,200,599 A    4/1993 Krichever et al.
5,214,270 A    5/1993 Rando et al.
5,260,553 A * 11/1993 Rockstein et al. ...... 235/462.01
5,600,121 A * 2/1997 Kahn et al. ............. 235/462.48

(List continued on next page.)

FOREIGN PATENT DOCUMENTS

| JP | 2-154598 A | * | 6/1990 |
| JP | 11-203397 A | * | 7/1999 |
| JP | 2002-290607 A | * | 10/2002 |

OTHER PUBLICATIONS

Product brochure for the LMC555 CMOS Timer by National Semiconductor Corporation, Mar. 2002, pp. 1–10.

*Primary Examiner*—Jared J. Fureman
(74) *Attorney, Agent, or Firm*—Thomas J. Perkowski, Esq.; Esq., P.C.

(57) ABSTRACT

A hand-supportable bar code symbol reading device having a laser scanning engine that is controlled to selectively operate in either an omni-directional scan mode or a single line scan mode. In the single line scan mode of operation, symbol character data produced by the laser scanning engine is communicated to a host device in response to an activation signal produced by a data transmission switch. In the omni-directional scan mode, symbol character data is communicated to the host device irrespective of the activation signal. Preferably, mode selection means selectively operates the laser scanning engine in either the omni-directional scan mode of operation or the single line scan mode of operation in response to placement of the device in a support stand, thereby enabling automatic operation as a stationary hands-free omni-directional projection scanner (in stand), and automatic operation as a portable hand-held line scanner (out of stand).

50 Claims, 23 Drawing Sheets

U.S. PATENT DOCUMENTS

| | | | |
|---|---|---|---|
| 5,608,202 A | | 3/1997 | Bridgelall et al. |
| 5,637,856 A | | 6/1997 | Bridgelall et al. |
| 5,691,528 A | | 11/1997 | Wyatt et al. |
| 5,719,385 A | * | 2/1998 | Wike, Jr. et al. ....... 235/462.09 |
| 5,789,730 A | | 8/1998 | Rockstein et al. |
| 5,796,091 A | | 8/1998 | Schmidt et al. |
| 5,844,227 A | | 12/1998 | Schmidt et al. |
| 5,962,838 A | * | 10/1999 | Tamburrini ............ 235/462.45 |
| 5,979,766 A | | 11/1999 | Rockstein et al. |
| 5,988,508 A | | 11/1999 | Bridgelall et al. |
| 6,085,981 A | | 7/2000 | Knowles et al. |
| 6,216,953 B1 | * | 4/2001 | Kumagai et al. ...... 235/472.01 |
| 6,247,647 B1 | | 6/2001 | Courtney et al. |
| 6,257,492 B1 | | 7/2001 | Bressler et al. |
| 6,283,375 B1 | | 9/2001 | Wilz et al. |
| 6,315,204 B1 | * | 11/2001 | Knighton et al. ...... 235/462.43 |
| 6,547,146 B1 | * | 4/2003 | Meksavan et al. ..... 235/462.46 |
| 6,595,420 B1 | * | 7/2003 | Wilz, Sr. et al. ........ 235/462.01 |
| 6,607,133 B2 | * | 8/2003 | Wilz, Sr. et al. ........ 235/462.45 |
| 6,637,659 B2 | * | 10/2003 | Wilz, Sr. et al. ........ 235/462.45 |
| 2002/0100804 A1 | * | 8/2002 | Byun et al. ............. 235/462.01 |
| 2002/0139855 A1 | * | 10/2002 | Dvorkis et al. ......... 235/462.01 |
| 2003/0146283 A1 | * | 8/2003 | Longacre, Jr. et al. ...... 235/454 |

\* cited by examiner

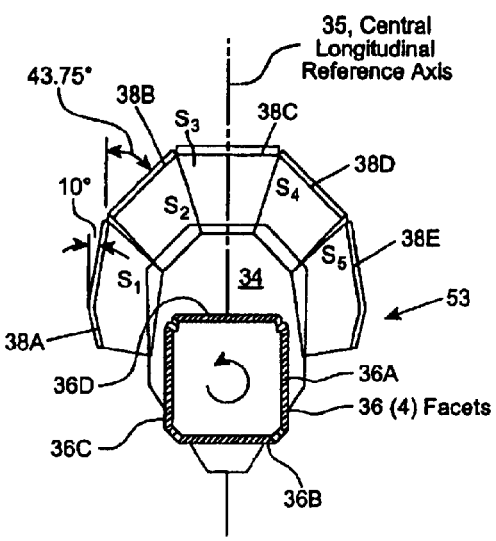
FIG. 4A
| | Twist α | Bend θ |
|---|---|---|
| $S_{1-5}$ | 10° | 46.0° |
| $S_{2-4}$ | 43.75° | 42.5° |
| $S_3$ | 90° | 40.5° |
FIG. 4E
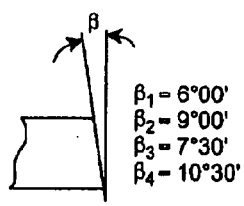
$\beta_1 = 6°00'$
$\beta_2 = 9°00'$
$\beta_3 = 7°30'$
$\beta_4 = 10°30'$
FIG. 4F

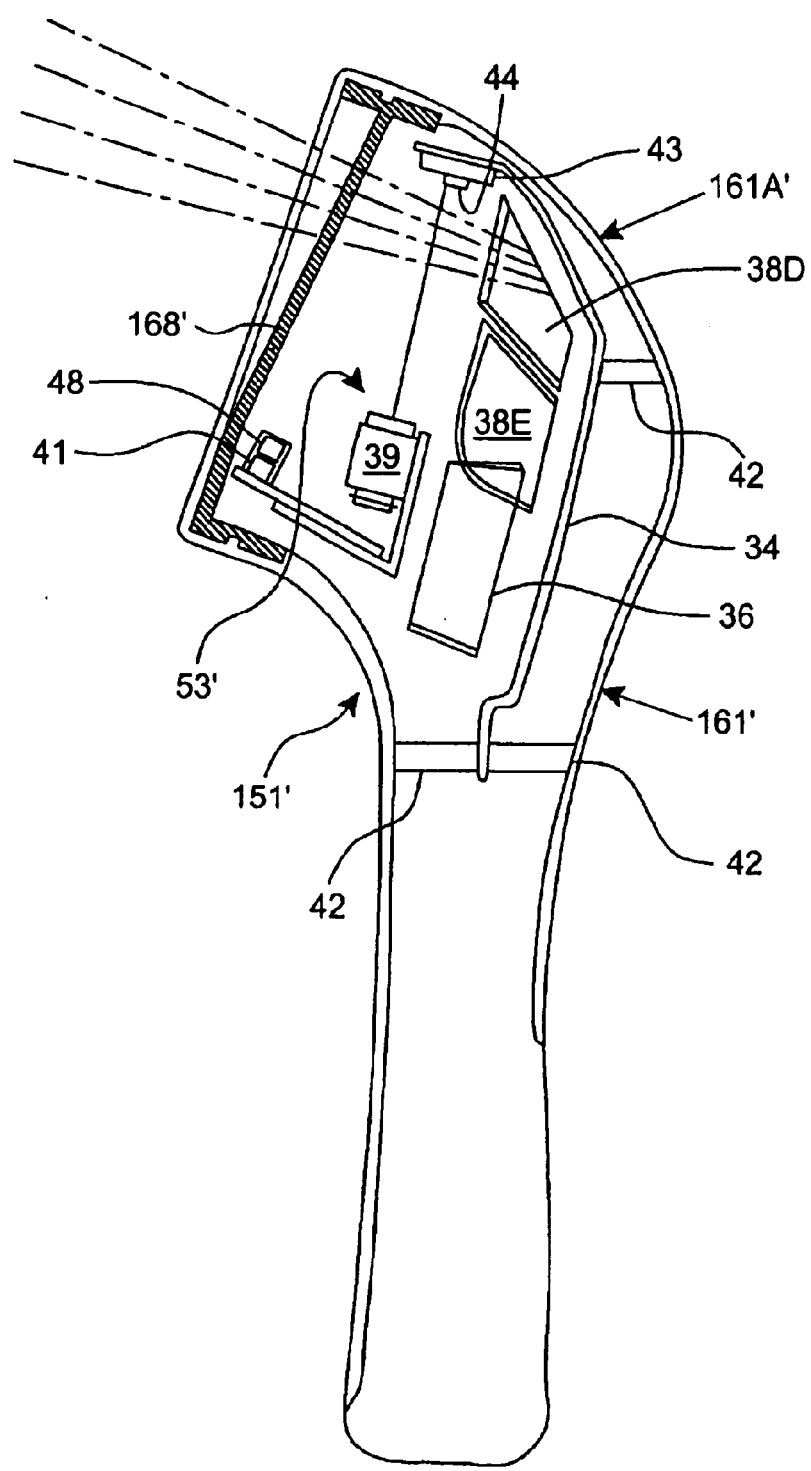
FIG. 4D1

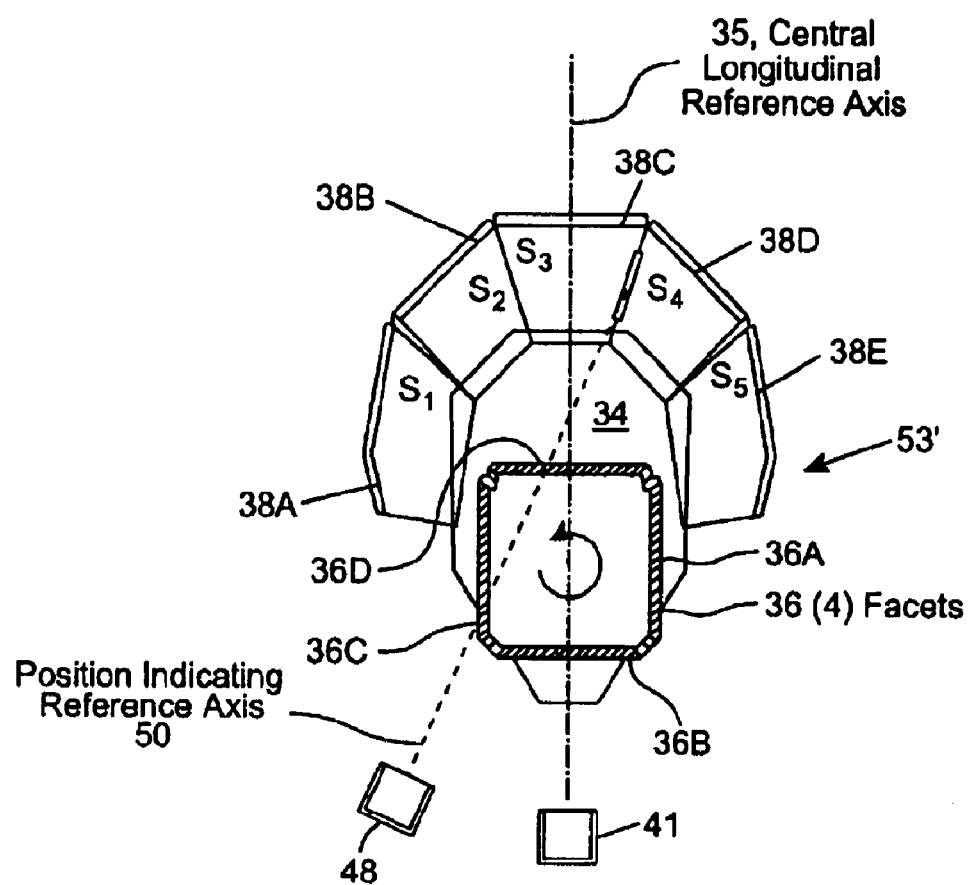
FIG. 4D2

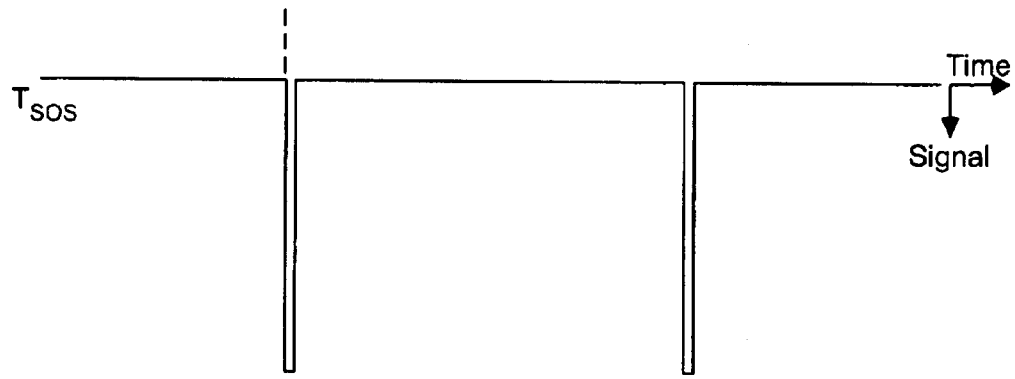
FIG. 7A
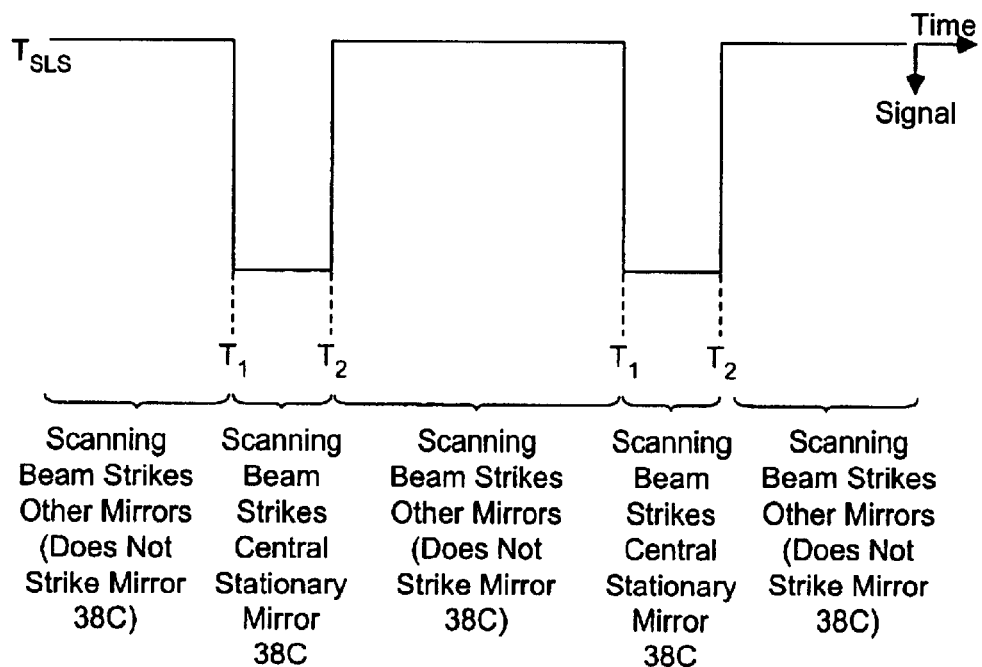
FIG. 7B
$$E_{10}' = (\overline{T_{SLS}} \times E_{10} \times A_5) + (E_{10} \times \overline{A_5})$$
FIG. 7C

AUTOMATICALLY-ACTIVATED HAND-SUPPORTABLE LASER SCANNING BAR CODE SYMBOL READING SYSTEM WITH OMNIDIRECTIONAL AND UNIDIRECTIONAL SCANNING MODES IN ADDITION TO A DATA TRANSMISSION ACTIVATION SWITCH

RELATED CASES

The present application is a continuation-in-part (CIP) of: U.S. patent application Ser. No. 09/204,176 filed Dec. 3, 1998 now U.S. Pat. No. 6,283,375 (108-027USA000) and co-pending U.S. patent application Ser. No. 09/452,976 filed Dec. 2, 1999 (108-078USA000). Each said patent application is assigned to and commonly owned by Metrologic Instruments, Inc. of Blackwood, N.J., and is incorporated herein by reference in its entirety.

BACKGROUND OF THE INVENTION

1. Field of the Invention

The present invention relates generally to improvements in automatic laser scanning bar code symbol reading systems, wherein laser scanning and bar code symbol reading operations are automatically initiated in response to the automatic detection of objects and/or bar code symbols present thereon.

2. Brief Description of the Prior Art

Bar code symbols have become widely used in many environments such as, for example, point-of-sale (POS) stations in retail stores and supermarkets, inventory management document tracking, and diverse data control applications. To meet the growing demands of this technological innovation, bar code symbol readers of various types have been developed for sending bar code symbols and producing symbol character data for use as input in automated data processing systems.

In general, prior art hand-held bar code symbol readers using laser scanning mechanisms can be classified into two major categories.

The first category of hand-held laser-based bar code symbol readers includes lightweight hand-held laser scanners having manually-actuated trigger mechanisms for initiating laser scanning and bar code symbol reading operations. The user positions the hand-held laser scanner at a specified distance from the object bearing the bar code symbol, manually activates the scanner to initiate reading, and then moves the scanner over other objects bearing bar code symbols to be read. Prior art bar code symbol readers illustrative of this first category are disclosed in U.S. Pat. Nos.: 4,575,625; 4,845,349; 4,825,057; 4,903,848; 5,107, 100; 5,080,456; 5,047,617; 4,387,297; 4,806,742; 5,021, 641; 5,468,949; 5,180,904; 5,206,492; 4,593,186; 5,247, 162; 4,897,532; 5,250,792; 5,047,617; 4,835,374; 5,017, 765; 5,600,121; 5,149,950; and 4,409,470.

The second category of hand-held laser-based bar code symbol readers includes lightweight hand-held laser scanners having automatically-activated (i.e. triggerless) mechanisms for initiating laser scanning and bar code symbol reading operations. The hand-held laser scanner is positioned at a specified distance from an object bearing a bar code symbol, the presence of the object is automatically detected using an infrared (IR) light beam or a low-power laser light beam, the presence of the bar code symbol on the object is detected using a visible laser light beam, and thereafter the detected bar code symbol is automatically scanned and decoded (i.e. read) to produce symbol character data representative of the read bar code symbol. Examples of laser-based bar code symbol reading systems belonging to this second category are disclosed in U.S. Pat. Nos. 5,844, 227; 4,639,606; 4,933,538; 5,828,048; 5,828,049; 5,825, 012; 5,808,285; 5,796,091; 5,789,730; 5,789,731; 5,777, 315; 5,767,501; 5,736,982; 5,742,043; 5,528,024; 5,525, 789; D-385,265; 5,484,992; 5,661,292; 5,637,852; 5,468, 951; 5,627,359; 5,424,525; 5,616,908; 5,591,953; 5,340, 971; 5,340,973; 5,557,093; 5,260,553.

Such automatically-activated laser scanning bar code symbol readers perform aggressive bar code symbol reading operations that are well suited for POS applications where the laser scanner is configured as a fixed presentation scanner (where the scanner is fixed while the bar-coded objects are moved through the scanning field). However, such aggressive bar code symbol reading operations may be problematic in some portable applications (where the scanner is moved or aimed onto a barcode label for reading), for example, when attempting to read a particular bar code from a list of bar code symbols closely printed on a bar code menu or like structure. In this situation, the scan line may scan across two or more bar code symbols at the same time thereby causing an inadvertent bar code symbol reading error. Oftentimes, such bar code symbol reading errors must be corrected at their time of occurrence, wasting valuable time and resources of the user.

In the fixed "presentation" mode of operation, because objects are often swept through the scanning field in random orientations, it is preferable to use an omni-directional scan pattern; however, such omni-directional scan pattern exacerbates the menu reading problem as described above.

U.S. Pat. Nos. 6,247,647; 5,962,838; and 5,719,385 describe bar code symbol reading devices having multiple line and single line scanning modes that potentially combat these problems. However, because such devices fail to provide the user with adequate control over the disposition of the bar code symbol reading process, such devices are susceptible to the menu reading problem as described above when the device (operating in single line scan mode) is positioned at a large distance from the object and the scan line is large due to the scanning geometry of the scanner.

Thus, there is a great need in the art for an improved system and method of reading bar code symbols using automatically-activated laser scanning mechanisms capable of automatically reading bar code symbols printed on diverse types of objects including, but not limited to, printed bar code symbol menus.

OBJECTS AND SUMMARY OF THE INVENTION

Accordingly, it is a primary object of the present invention to provide an improved device and method of reading bar code symbols using an automatically-activated laser scanning mechanism while overcoming the above described shortcomings and drawbacks of prior art devices and techniques.

Another object of the present invention is to provide an automatically-activated laser scanning bar code symbol reading device and method which provides the user with a greater degree of control over the disposition of bar code symbol reading processes automatically initiated to read bar code symbols printed on diverse types of objects including, but not limited to, printed bar code symbol menus.

Another object of the present invention is to provide an automatically-activated bar code symbol reading device comprising a bar code symbol reading mechanism contained within a hand-supportable housing that is capable of operating in two different scan modes: in a first scan mode, the bar code symbol reading mechanism automatically generates an omni-directional visible laser scanning pattern for repeatedly reading one or more bar code symbols on an object during a bar code symbol reading cycle, and automatically generating a new symbol character data string in response to each bar code symbol read thereby; in a second scan mode, the bar code symbol reading mechanism automatically generates a single line visible laser scanning pattern for repeatedly reading one or more bar code symbols on an object during a bar code symbol reading cycle, and automatically generating a new symbol character data string in response to each bar code symbol read thereby.

Another object of the present invention is to provide such an automatically-activated laser scanning bar code symbol reading device, wherein the bar code symbol reading mechanism automatically enters the first "omni-directional" scan mode when the hand-supportable housing is placed in a support stand (that supports the housing), and automatically enters the second "single-line" scan mode when the hand-supportable housing is removed from the support stand.

Another object of the present invention is to provide an automatically-activated bar code symbol reading device comprising a manually-actuatable data transmission control (activation) switch that is capable of producing a control activation signal that enables communication of symbol character data (produced by the bar code symbol reading system) to a host system in an automatic manner.

Another object of the present invention is to provide such an automatically-activated laser scanning bar code symbol reading device, wherein the control subsystem thereof enables the transmission of produced symbol character data to the associated host system or data storage device, only when the data transmission control switch provided on the exterior of the scanner housing is manually actuated by the user during a bar code symbol reading cycle.

Another object of the present invention is to provide such an automatically-activated laser scanning bar code symbol reading device, wherein the bar code symbol reading cycle is visually signaled to the user by a bar code symbol reading state indicator provided on the scanner housing.

Another object of the present invention is to provide a automatically-activated bar code symbol reading device which comprises: (i) a hand-supportable housing, (ii) a preprogrammed set of operational states wherethrough the device automatically passes during each bar code symbol reading operation, without requiring manual actuation of a switch, trigger or like component within the system, and (iii) a preprogrammed symbol character data transmission state of operation into which the device is automatically induced in response to manual-actuation of a data transmission control switch provided on the exterior of the housing of the bar code symbol reader.

Another object of the present invention is to provide such an automatically-activated bar code symbol reading device, wherein the preprogrammed set of operational states include an object detection state of operation, a bar code presence detection state of operation, and a bar code symbol reading state of operation, wherein each of these states of operation are automatically activated in response to the automatic detection of predetermined conditions in the object detection field, bar code symbol detection field and/or bar code reading field of the device.

Another object of the present invention is to provide such an automatically-activated bar code symbol reading device, wherein the objection detection is carried out using either infrared (IR) signal transmission/receiving technology, or low-power non-visible laser beam signaling technology.

Another object of the present invention is to provide an automatically-activated bar code symbol reading device comprising a set of color-encoded light sources provided on the exterior of the system housing for sequentially generating a set of visually-perceptible state indication signals that visually indicate to the user the various states of operation, wherethrough the device automatically passes during each bar code symbol reading cycle.

Another object of the present invention is to provide such an automatically-activated bar code symbol reading device, wherein the set of color-encoded state indicating light sources on the exterior of the housing sequentially generate a visually-perceptible object detection indication signal when the device is automatically induced into the object detection state of operation, a visually-perceptible bar code symbol presence detection indication signal when the device is automatically induced into its bar code symbol detection state of operation, and a visually-perceptible bar code symbol read indication signal when the device is automatically induced into its bar code symbol reading state of operation.

A further object of the present invention is to provide such an automatically-activated bar code symbol reading device, wherein the hand-supportable bar code symbol reading device can be used as either a portable hand-supported laser scanner in an automatic hands-on mode of operation having a manually-activated data transmission state of operation, or as a stationary laser projection scanner in an automatic hands-free mode of operation having a automatically-activated data transmission state of operation.

A further object of the present invention is to provide such an automatically-activated bar code reading device, wherein a support stand is provided for supporting the hand-supportable bar code symbol reading device in its automatic hands-free mode of operation and automatically generating a data transmission control activation signal to enable the automatically-activated data transmission state in this operational mode.

A further object of the present invention is to provide an automatically-activated bar code reading device wherein a visible laser light source, scanning element and a plurality of stationary mirrors cooperate to produce an omni-directional scan pattern.

A further object of the present invention is to provide an automatically-activated bar code reading device wherein a visible laser light source, scanning element and a predetermined subset of a plurality of stationary mirrors cooperate to produce a single line scan pattern.

A further object of the present invention is to provide such an automatically-activated bar code reading device wherein the power (e.g. duty cycle) of the visible laser light is controlled to selectively enable the laser light source to produce normal laser light only when the light produced therefrom is directed by said scanning element onto the predetermined subset of stationary mirrors.

A further object of the present invention is to provide such an automatically-activated bar code reading device that derives timing signals synchronized to a particular interval in the rotation cycle of a rotating light directing element when the rotating light directing element directs light produced from the laser light source onto the predetermined subset of stationary mirrors.

A further object of the present invention is to provide such an automatically-activated bar code reading device that derives such timing signals from a position sensor integrated into a rotating portion of the rotating light directing element.

A further object of the present invention is to provide such an automatically-activated bar code reading device that derives such timing signals a position indicating optical element mounted adjacent (or near) the perimeter of one of said stationary mirrors, such that the position indicating optical element is illuminated by light produced from said laser light source when the rotating light directing element reaches a predetermined point in its rotation.

It is another object of the present invention to provide an automatically-activated bar code symbol reading system with a mode of operation that permits the user to automatically read one or more bar code symbols on an object in a consecutive manner.

A further object of the present invention is to provide a point-of-sale station incorporating the automatically-activated bar code symbol reading system of the present invention.

Another object of the present invention is to provide a portable, fully automatic bar code symbol reading system which is compact, simple to use and versatile.

Yet a further object of the present invention is to provide a novel method of reading bar code symbols using the automatically-activated bar code symbol reading system of the present invention.

BRIEF DESCRIPTION OF THE DRAWINGS

For a fuller understanding of the Objects of the Present Invention, the Detailed Description of the Illustrated Embodiments of the Present Invention should be read in conjunction with the accompanying drawings, wherein:

FIGS. 4A and 4B illustrate an exemplary laser scanning platform that employs a mechanism that controls the power (e.g., duty cycle) of a laser light source to selectively produce an omni-directional scan pattern or the single line scan pattern.

FIGS. 4C and 4D1 and 4D2 illustrative exemplary mechanisms that provide synchronization of the power control cycle (e.g., duty cycle) of the laser light source to the particular interval in the rotation cycle of the rotating polygon when the rotating polygon directs the scanning laser beam to the central stationary mirror of the platform of FIGS. 4A and 4B.

FIGS. 4E and 4F set forth exemplary construction parameters used in the laser scanning platform of the illustrative embodiment;

As shown in FIGS. 5C and 5D, the head portion 161A of the device 151' continuously extends into contoured handle portion 161B at an obtuse angle α (which, in the illustrative embodiment, is about 115 degrees), and the mass balance of the device 151' is particularly designed to minimize the torque imposed on the user's wrists and forearms while using the bar code symbol reading device in the hands-on mode of operation.

FIG. 7A illustrates an example of the timing signal $T_{SOS}$ produced by the SOS photoreceiving circuit of FIGS. 6A and 6B, including pulses (e.g., a pulse train), each corresponding to a single rotation of the rotating polygon, that are synchronized to the time $T_1$ when the scanning beam is incident on (or near) the trailing edge of the particular mirror group (e.g., central stationary mirror 38C) that provides the uni-directional single scan line.

FIG. 7B illustrates an example of the timing signal $T_{SLS}$ produced by the timing signal generator circuit of FIGS. 6A and 6B, including pulses (e.g., a pulse train) each corresponding to a single rotation of the rotating polygon and each having a leading and trailing edge synchronized to the time interval between $T_2$ and $T_1$ when the scanning beam (as redirected by the rotating polygon) strikes the particular mirror group (e.g., central stationary mirror 38C) that provides the unidirectional single scan line.

FIG. 7C is an example of Boolean logic expressions that selectively enable the VLD drive circuitry of the scanning circuit of FIGS. 6A and 6B to provide VLD duty cycle control. The first term provides enablement of the VLD drive circuitry in the uni-directional (single scan line) scan mode of operation (which is dictated by the control circuitry 611A with signals $E_{10}=1$ and $A_5=1$). The second term provides the enablement of the VLD drive circuitry in the omni-directional (multiple scan line) scan mode of operation (which is dictated by the control circuitry 611A with signals $E_{10}=1$ and $A_5=0$).

DETAILED DESCRIPTION OF THE ILLUSTRATIVE EMBODIMENTS OF THE PRESENT INVENTION

Figure 1A:
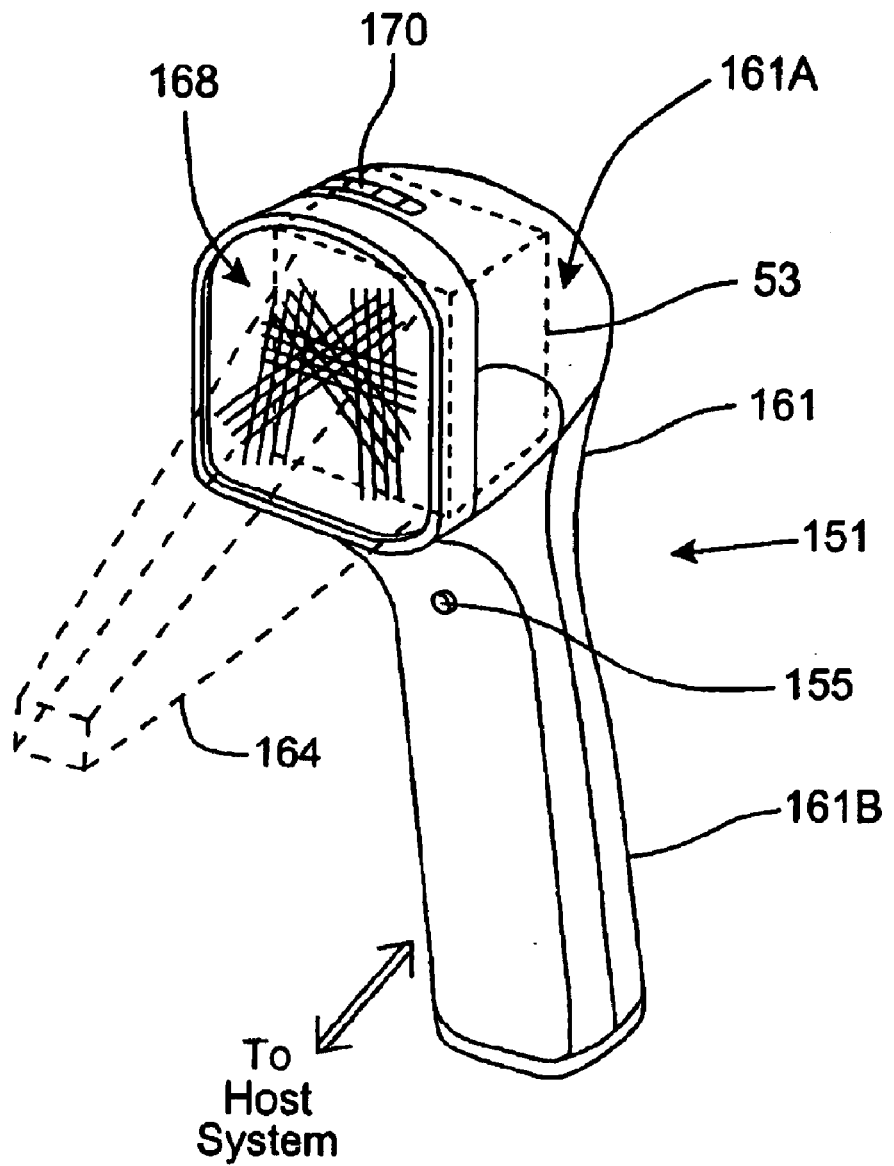
FIG. 1A illustrates the omni-directional scan mode of operation of an automatically-activated hand-holdable bar code symbol reading device according to the present invention, wherein a laser scanning engine 53 produces an omni-directional laser scanning pattern (forming multiple-scan lines) passing through light transmission window 168 for the purpose of scanning bar code symbols on objects within a narrowly confined 3-D scanning volume 164, while preventing unintentional scanning of bar code symbols on objects located outside thereof.

Referring to the figures in the accompanying Drawings, the various illustrative embodiments of the automatically-activated laser scanning bar code symbol reading system of the present invention will be described in great detail, wherein like elements will be indicated using like reference numerals.

Prior to detailing the various illustrative embodiments of the present invention, it will be helpful to first provide a brief overview of the system and method thereof.

Figure 1B:
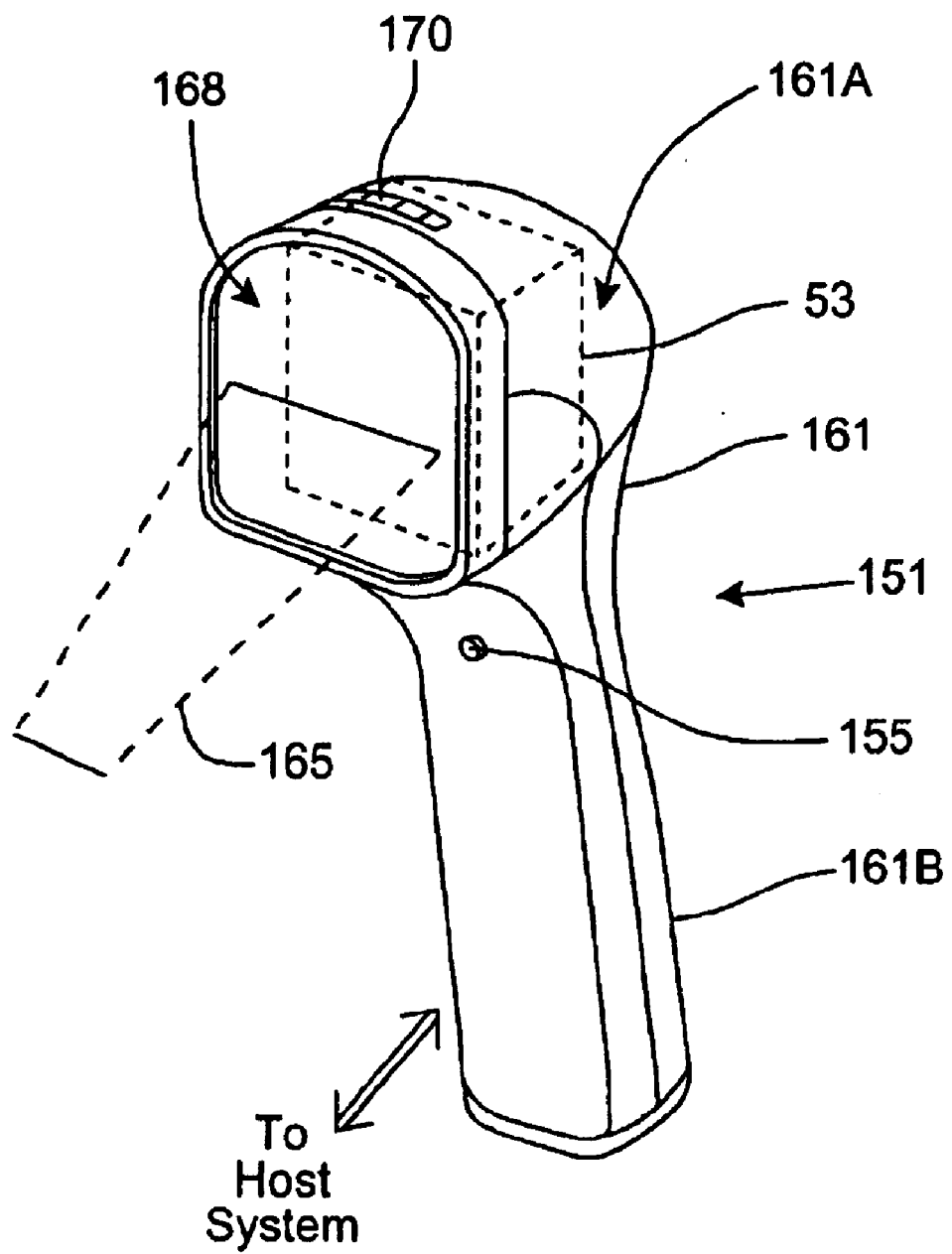
FIG. 1B illustrates the unidirectional scan mode of operation of an automatically-activated hand-holdable bar code symbol reading device according to the present invention, wherein a laser scanning engine 53 produces a uni-directional laser scanning pattern (forming a single scan line) passing through light transmission window 168 for the purpose of scanning bar code symbols on objects within a one dimensional scanning field 165, while preventing unintentional scanning of bar code symbols on objects located outside thereof.

As illustrated in FIGS. 1A and 1B, the automatically-activated hand-holdable bar code symbol reading device 151 of the present invention includes a hand-supportable housing 161 having a head portion 161A that encloses a laser scanning bar code symbol reading engine 53 that is capable of operating in an omni-directional scan mode of operation and in a unidirectional scan mode of operation.

FIG. 1A illustrates the omni-directional scan mode of operation wherein the engine 53 produces an omni-directional laser scanning pattern (forming multiple-scan lines) passing through light transmission window 168 for the purpose of scanning bar code symbols on objects within a narrowly confined 3-D scanning volume 164, while preventing unintentional scanning of bar code symbols on objects located outside thereof. After the successful reading of a bar code symbol by the engine 53, symbol character data (corresponding to the same bar code symbol) is automatically transmitted from the engine 53 to a host system (e.g. electronic cash register system, data collection device, or other data storage/processing device, etc.) over a communication link therebetween (which, for example, may be a wireless data link or wired serial data link (such as an RS-232 link or USB link) or a wired parallel data bus). The omni-directional multiple line scan mode of operation is useful in applications, such as point of sale systems, where the orientation of the object/bar code to be scanned may vary.

FIG. 1B illustrates the uni-directional scan mode of operation wherein the engine 53 produces a uni-directional laser scanning pattern (forming a single scan line) passing through light transmission window 168 for the purpose of scanning bar code symbols on objects within a one dimensional scanning field 165, while preventing unintentional scanning of bar code symbols on objects located outside thereof. After the successful reading of a bar code symbol by the engine 53 and the timely actuation of data transmission activation switch 155, symbol character data (corresponding to the same bar code symbol) is transmitted from the engine 53 to the host system (e.g. electronic cash register system, data collection device, or other data storage/processing device, etc.) over the communication link therebetween. Such unidirectional single line scanning and manually activated data transmission is useful in applications (such as applications that involve menus and/or catalogs) where multiple bar codes are located proximate to one another, and in applications that use two-dimensional bar codes.

As shown in FIGS. 1A and 1B, a set of color-coded state indicator lights 170 are preferably mounted on the head portion of the device housing 161A, for visually displaying the particular state in which the system resides at any instant of time. A more detailed description of exemplary color-coding schemes are set forth below.

Figure 2A:
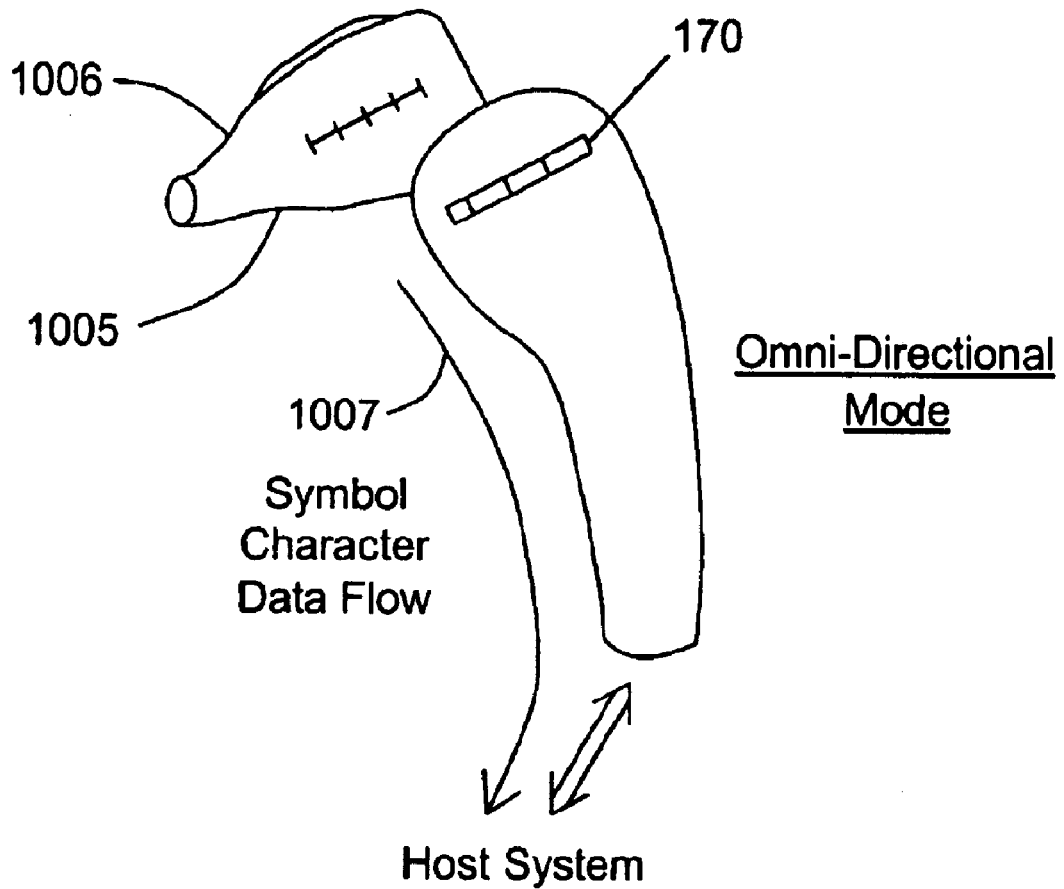
FIG. 2A illustrates the bar code symbol reading operations of the automatically-activated hand-holdable bar code symbol reading device when operating in the omni-directional scan mode of operation of FIG. 1A.

FIG. 2A illustrates the bar code symbol reading operations of the bar code symbol reading device 151 when operating in the omni-directional scan mode of operation of FIG. 1A. During such symbol reading operations, the bar code symbol reading engine 53 automatically produces a visible onmi-directional (multiple line) laser scanning pattern for repeatedly reading one or more bar code symbols 1005 on an object 1006, and automatically generates a symbol character data string 1007 in response to a given bar code symbol read thereby. In general, the symbol reading operations performed by the engine 53 has a predetermined time extent controlled by one or more timers that are periodically monitored during system operation.

During such bar code symbol reading operations, it is assumed that user 1007 has visually aligned the visible omni-directional (multiple line) laser scanning pattern produced by the engine 53 with a particular bar code symbol 1005 on an object (e.g. product, bar code menu, etc.) 1006 so that the bar code symbol 1005 is scanned, detected and decoded, thereby producing a bar code symbol character string corresponding thereto. Upon successful decoding of a given bar code symbol, an indicator light (for example one of the indicator lights 170) on the hand-supportable housing 161 preferably is actively driven and the bar code symbol character string 1007 corresponding to the given bar code symbol, schematically depicted as a directional-arrow structure, is automatically transmitted to the host system.

Figure 2B:
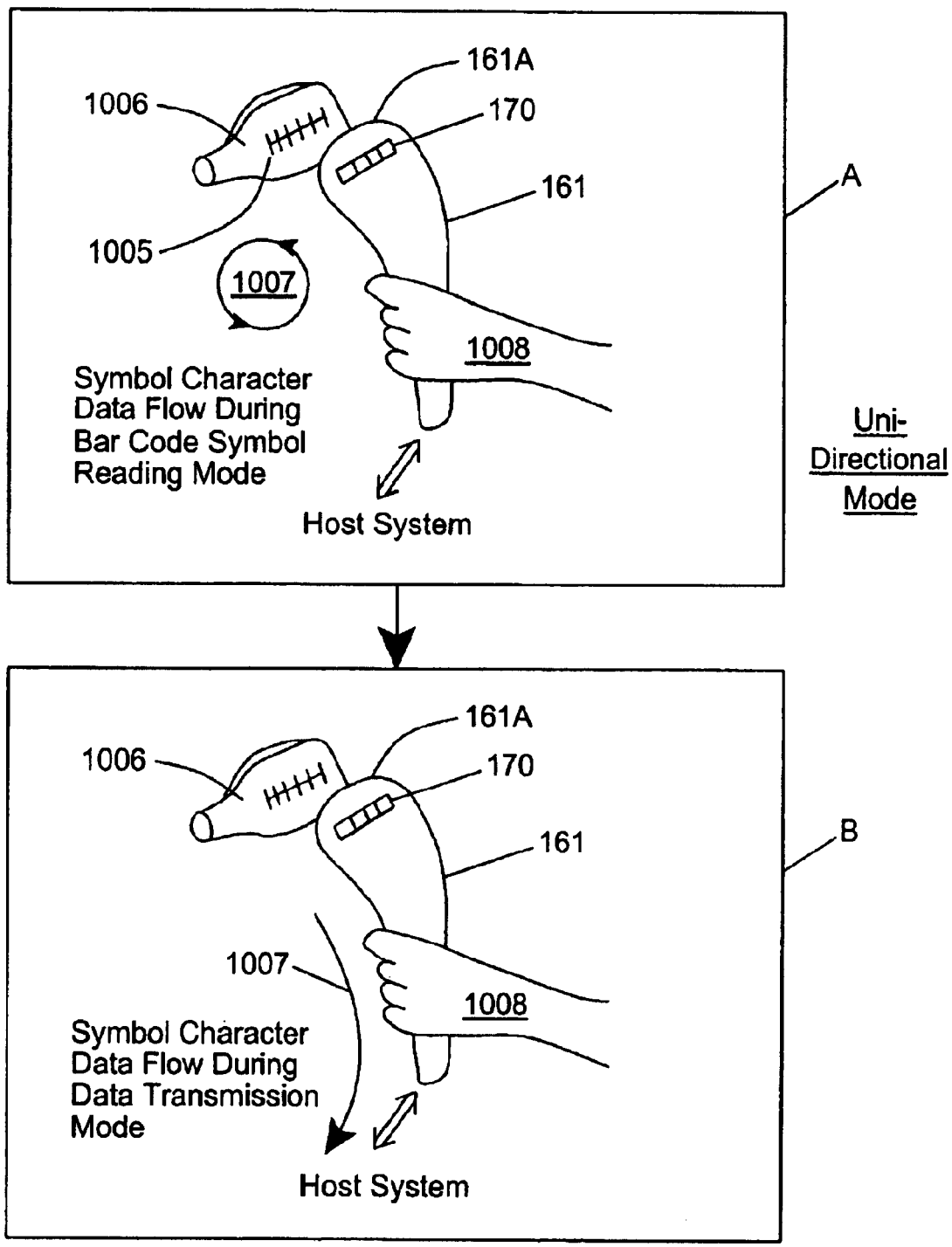
FIG. 2B illustrates the bar code symbol reading operations of the automatically-activated hand-holdable bar code symbol reading device when operating in the uni-directional scan mode of operation of FIG. 1B.

FIG. 2B illustrates the bar code symbol reading operations of the bar code symbol reading device 151 when operating in the uni-directional scan mode of operation of FIG. 1B. During such symbol reading operations, the bar code symbol reading engine 53 automatically produces a visible uni-directional (single line) laser scanning pattern for repeatedly reading one or more bar code symbols 1005 on an object 1006, and automatically generates a symbol character data string 1007 in response to a given bar code symbol read thereby. In general, the symbol reading operations performed by the engine 53 has a predetermined time extent controlled by one or more timers that are periodically monitored during system operation.

During such bar code symbol reading operations, it is assumed that user 1008 has visually aligned the visible uni-directional (single line) laser scanning pattern produced by the engine 53 with a particular bar code symbol 1005 on an object (e.g. product, bar code menu, etc.) 1006 so that the bar code symbol 1005 is scanned, detected and decoded. Each time a scanned bar code symbol is successfully read during a bar code symbol reading cycle, a new bar code symbol character string, schematically depicted as a circulating-arrow structure 1007, is produced and an indicator light (for example one of the indicator lights 170) on the hand-supportable housing 161 preferably is actively driven. As indicated at Block B, upon actuation of the data transmission switch 155 during the bar code symbol reading operation, a data transmission control activation signal is internally produced, enabling the symbol character data string 1007, schematically depicted as a directional-arrow structure, to be selected and transmitted to the host system. However, if the user 1008 does not actuate the data transmission switch 155 during the bar code symbol reading operation, the data transmission control activation signal is not produced, and the symbol character data string 1007 is not transmitted to the host system.

By virtue of the present invention, an automatically-activated dual-mode hand-supportable bar code symbol reader is provided that is selectively operated in either an omni-directional scan mode of operation or a uni-directional (single line) scan mode of operation, to thereby enable the reading of diverse types of bar code symbols on bar code menus, consumer products positioned in crowded POS environments, and other objects requiring automatic identification and/or information access and processing.

Moreover, in the both the omni-directional and uni-directional scan modes of operation, bar code symbol detection and bar code symbol reading operations are carried out in a fully automatic manner, without the use of a manually-actuated trigger or like mechanism, as disclosed, for example, in U.S. Pat. Nos. 5,828,048; 5,828,049; 5,825,012; 5,808,285; 5,796,091; 5,789,730; 5,789,731; 5,777,315; 5,767,501; 5,736,482; 5,661,292; 5,627,359; 5,616,908; 5,591,953; 5,557,093; 5,528,024; 5,525,798, 5,484,992; 5,468,951; 5,425,525; 5,240,971; 5,340,973; 5,260,553; incorporated herein by reference.

Figure 3:
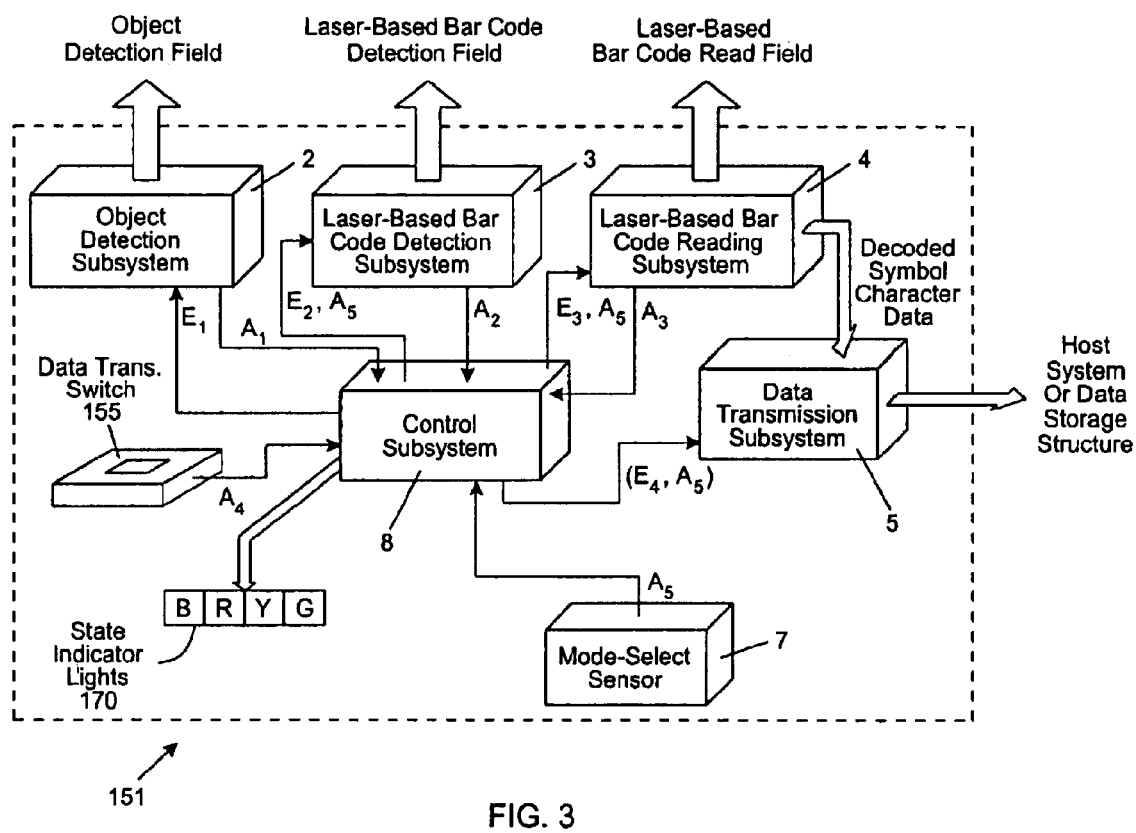
FIG. 3 illustrates a generalized system design of the automatically-activated hand-holdable bar code symbol reading device according to the present invention, including an object detection subsystem 2; a laser-based bar code symbol detection subsystem 3; a laser-based bar code symbol reading subsystem 4; a data transmission subsystem 5; a state indication subsystem 6; a data transmission activation switch 155 integrated with the scanner housing in part or whole; a mode-selection switch or sensor 7 integrated with the scanner housing in part or whole; and a system control subsystem 8 operably connected to the other subsystems described above. In general, device 151 has a number of preprogrammed operational states (or modes), namely: an Object Detection State; a Bar Code Symbol Detection State; a Bar Code Symbol Reading State; and a Data Transmission State.

A generalized system design of the automatically-activated hand-holdable bar code symbol reading device 151 according to the present invention is shown in FIG. 3, including: an object detection subsystem 2; a laser-based bar code symbol detection subsystem 3; a laser-based bar code symbol reading subsystem 4; a data transmission subsystem 5; a state indication subsystem 6; a data transmission activation switch 155 integrated with the scanner housing in part or whole; a mode-selection switch or sensor 7 integrated with the scanner housing in part or whole; and a system control subsystem 8 operably connected to the other subsystems described above. In general, device 151 has a number of preprogrammed operational states (or modes), namely: an Object Detection State; a Bar Code Symbol Detection State; a Bar Code Symbol Reading State; and a Data Transmission State.

The object detection subsystem 2 operates in the Object Detection State to automatically detect if an object exists within the object detection field (which is proximate to the scanning field of the device 151) and automatically generate a first control activation signal $A_1$ indicative thereof (for example, $A_1=0$ is indicative that an object has not been detected within the object detection field, and $A_1=1$ is indicative that an object has been detected within the object detection field). As shown in FIG. 3, the first control activation signal $A_1$ is provided to the system control subsystem 8 for detection, analysis and programmed response. In general, the object detection subsystem 2 can utilize electromagnetic radiation or acoustical energy, either sensible or non-sensible by the operator, to automatically detect if an object exists within the object detection field.

For example, the object detection subsystem 2 may project a pulsed beam of infrared light from the housing 161 into the object detection field, which is a three-dimensional volumetric expanse spatially coincident with the pulsed infrared light beam. When an object within the object detection field is illuminated by the pulsed infrared light beam, infrared light reflected there from will be returned toward the housing 161, where it can be detected to derive an indication that an object exists within the object detection field. Details of an exemplary object detection subsystem 2 that implements this approach is described in U.S. Pat. No. 5,789,730 to Rockstein et al, commonly assigned to the assignee of the present invention, herein incorporated by reference in its entirety.

Alternatively, the object detection subsystem 2 may project a pulsed laser beam of visible light from the housing 161 into the object detections filed, which is a three-dimensional volumetric expanse spatially coincident with the pulsed laser beam. When an object within the object detection field is illuminated by the pulsed laser beam, light reflected there from will be returned toward the housing 161, where it can be detected to derive an indication that an object exists within the object detection field. Details of exemplary object detection subsystems that implement this approach is described in U.S. Pat. No. 4,639,606 to Boles, et al, and U.S. Pat. No. 4,933,538 to Heiman, et al. herein incorporated by reference in their entirety.

Alternatively, the object detection subsystem 2 may project ultrasonic energy from the housing 161 into the object detection field, which is a three-dimensional volumetric expanse spatially coincident with such ultrasonic energy. When an object within the object detection field is illuminated by the ultrasonic energy, ultrasonic energy reflected there from will be returned toward the housing 161, where it can be detected to derive an indication that an object exists within the object detection field.

Alternatively, the object detection subsystem 2 may utilize a passive technique that utilizes ambient light to detect that an object exists in the object detection field. More specifically, when an object within the object detection field is illuminated by ambient light, light reflected therefrom will be returned toward the housing 161, where it can be detected to derive an indication that an object exists within the object detection field. Details of exemplary object detection subsystems that implement this approach is described in U.S. Pat. No. 5,789,730 to Rockstein et al, commonly assigned to the assignee of the present invention, incorporated by reference above in its entirety.

In addition, the object detection subsystem 2 may utilize two different modes of object detection: a long range mode of object detection and a short range mode of object detection. Details of exemplary object detection subsystems that implement this approach is described in U.S. Pat. No. 5,789,730 to Rockstein et al, commonly assigned to the assignee of the present invention, incorporated by reference above in its entirety.

The laser-based bar code symbol presence detection subsystem 3 operates in the Bar Code Symbol Detect State to automatically scan the scanning field (with an onmi-directional multiple line scan pattern or a uni-directional single line scan pattern) to detect if a bar code is present with the scanning field of the device 151, and automatically generate a second control activation signal $A_2$ indicative thereof (for example, $A_2=0$ is indicative that a bar code is not present within the scanning region, and $A_2=1$ is indicative that a bar code is present within the scanning region). As shown in FIG. 3, the second control activation signal $A_2$ is provided to the system control subsystem 8 for detection, analysis and programmed response. As described below in detail, a mode select sensor 7 generates a fifth control activation signal $A_5$ which indicates if the device 151 is to operate in an omni-directional (multiple line) scan mode (e.g., $A_5=0$) or in a uni-directional (single line) scan mode (e.g., $A_5=1$). This signal $A_5$ is provided to the laser-based bar code symbol detection subsystem 3, which selectively utilizes either an omni-directional multiple line scan pattern or a unidirectional single line scan pattern to detect if a bar code is present with the scanning field of the device 151 in response based upon the fifth control activation signal $A_5$. For example, the laser-based bar code symbol detection subsystem 3 may utilize an omni-directional multiple line scan pattern to detect if a bar code is present with the scanning field of the device 151 in response to the signal $A_5=0$, and utilize a uni-directional single line scan pattern to detect if a bar code is present with the scanning field of the device 151 in response to the signal $A_5=1$.

The bar code symbol detection subsystem 3 does not carry out a bar code symbol decoding process, but rather rapidly determines whether the received scan data signals represent a bar code symbol residing within the scan field. There are a number of ways in which to achieve bar code symbol detection. For example, the bar code symbol detection subsystem 3 may detect the first and second borders of the bar code symbol "envelope". This is achieved by first processing a digital scan data signal to produce digital "count" and "sign" data. The digital count data is representative of the measured time interval (i.e. duration) of each signal level occurring between detected signal level transitions which occur in digitized scan data signal. The digital sign data, on the other hand, indicates whether the signal level between detected signal level transitions is either a logical "1", representative of a space, or a logical "0", representative of a bar within a bar code symbol. Using the digital count and sign data, the bar code symbol detection subsystem 3 identifies the first and second borders of the bar code envelope, and thereby determines whether or not the envelope of a bar code symbol is represented by the scan data collected from the scan field. When a bar code symbol envelope is detected, the bar code symbol detection subsystem 3 automatically generates a second control activation signal $A_2=1$, which is indicative that a bar code is present within the scanning region.

The bar code symbol detection subsystem 3 may utilize two different modes of bar code symbol detection, namely: a long-range mode of bar code symbol detection and a short-range mode of bar code symbol detection as taught in U.S. Pat. No. 5,789,730, incorporated by reference above in its entirety.

The laser-based bar code symbol reading subsystem 4 operates in the Bar Code Symbol Reading State to automatically scan the scanning field (with an omni-directional multiple line scan pattern or a uni-directional single line scan pattern) to detect and decode bar code symbols on objects therein, produce bar code symbol character data representative of the detected and decoded bar code symbol, and automatically generate a third control activation signal $A_3$ indicative of a successful decoding operation (for example, $A_3=0$ is indicative that a successful decoding operation has not occurred, and $A_3=1$ is indicative that a successful decoding operation has occurred). As shown in FIG. 3, the third control activation signal $A_3$ is provided to the system control subsystem 8 for detection, analysis and programmed response. The signal $A_5$ generated by the mode select sensor 7 is also provided to the laser-based bar code symbol detection subsystem 3, which selectively utilizes either an omni-directional multiple line scan pattern or a uni-directional single line scan pattern to detect and decode bar code symbols on objects within the scanning field of the device 151 in response to the signal $A_5$. For example, the symbol detection subsystem 3 may utilize an omni-directional multiple line scan pattern to detect and decode bar code symbols in response to the signal $A_5=0$, and utilize a unidirectional single line scan pattern to detect and decode bar code symbols in response to the signal $A_5=1$.

The data transmission subsystem 5 operates in the Data Transmission State to automatically transmit symbol character data (produced by the operation of the bar code symbol reading subsystem 4 in the Bar Code Symbol Reading State as described above) to the host system (to which the bar code reading device 151 is connected) or to some other data storage and/or processing device. Preferably, the operation of the data transmission system 5 in the Data Transmission State occurs when the system control subsystem 8 detects that either one of the following two conditions have been satisfied:

i) generation of the third control activation signal (e.g., $A_3=1$) within a predetermined time period, indicative that the bar code symbol has been read, and generation of data transmission control activation control signal (e.g., $A_4=1$) produced from data transmission activation switch 155 within a predetermined time frame, indicative that the user desires the produced bar code symbol character data to be transmitted to the host system or intended device; or ii) generation of the third control activation signal (e.g., $A_3=1$) within a predetermined time period, indicative that the bar code symbol has been read, and generation of fifth control activation signal $A_5$ (e.g., $A_5=0$) indicative that device 151 is to operate in omni-directional (multiple line) scan mode.

Note that the mode-select sensor 7, when indicating that device 151 is to operate in omni-directional (multiple line) scan mode (e.g., $A_5=0$), effectively overrides the data transmission switch 155, enabling the automatic transmission of bar code symbol character strings to the host system.

Within the context of the system design shown in FIG. 3, the primary function of the state-select sensor 7 is to generate the fifth control activation signal $A_5$, which indicates if the device 151 is to operate in an omni-directional (multiple line) scan mode (e.g., $A_5=0$) or in a unidirectional (single line) scan mode (e.g., $A_5=1$).

In the preferred embodiment of the present invention, the hand-holdable bar code symbol reading device 151 of the present invention operates in the omni-directional (multiple line) scan mode (e.g., $A_5=0$) as a hand-free presentation scanner whereby the operator passes objects and associated bar code symbols though the scanning field of the device 151 in order to automatically read the bar code symbols therein and automatically transmit corresponding bar code symbol character strings to the host system, and operates in the uni-directional (single line) scan mode (e.g., $A_5=1$) as a hands-on scanner whereby the operator positions the scanner so that an object and associated bar code symbol passes though the scanning field of the device 151 in order to automatically read the bar code symbol therein and then activate the transmission of the corresponding bar code symbol data string to the host computer upon timely manual activation of a data transmission activation switch.

The state-select sensor 7 may utilize a manual or automated mechanism (or both) in generating the fifth control activation signal $A_5$. The manual mechanism may include a manual two-state switch (e.g., button) mounted into the housing 161 of the device 151. In an initial configuration, the manual switch generates and provides the control signal $A_5=0$. When the user first presses the manual switch, the manual switch generates and provides the control signal $A_5=1$. And when the user presses the manual switch a second time, the manual switch generates and provides the control signal $A_5=0$. Similar to the operation of a push button light switch, subsequent presses of the manual switch follow this two-state activation sequence: $A_5=0$ to $A_5=1$ back to $A_5=0$. The automatic mechanism may include a sensor that detects whether the hand-holdable bar code symbol reading device 151 has been placed within a support stand (or placed on a countertop or like surface in those instances where it has been designed to do so) and automatically generates the control signal $A_5$ in response thereto. For example, the state-select sensor 7 may automatically generate the signal $A_5=0$ upon detection that the hand-holdable bar code symbol reading device 151 has been placed within a support stand (or placed on a countertop or like surface in those instances where it has been designed to do so), and automatically generate the signal $A_5=1$ upon detection that the hand-holdable bar code symbol reading device 151 has been removed from the support stand (or lifted off the countertop or like surface in those instances where it has been designed to do so). A more detailed description of an exemplary state-select sensor 7 that detects whether or not the hand-holdable bar code symbol reading device 151 has been placed within a support stand and automatically generates fifth control activation signal $A_5$ in response thereto is described below with respect to Figure??.

Within the context of the system design shown in FIG. 3, the state indication subsystem 6 produces visual indication (e.g. color-coded light) signals that are emitted from the scanner housing 161 to inform the user of the current state of operation of the system (e.g. "blue" to indicate the object detection state, "red" to indicate the bar code detection state, "yellow" to indicate the bar code reading state, and "green" to indicate the symbol character data transmission state). As will be described in greater detail hereinafter, such state indication signals provide the user with visual feedback on the states of operation of the system, thereby improving the intuitiveness and facility of operation of the system in diverse application environments.

Within the context of the system design shown in FIG. 3, the system control subsystem 8 performs the following primary functions: (i) automatically receiving control activation signals $A_1$, $A_2$, $A_3$, $A_4$ and $A_5$ (ii) automatically generating enable signals $E_1$, $E_2$, $E_3$, $E_4$ and $E_5$ and (iii) automatically controlling the operation of the other subsystems in accordance with a system control program carried out by the system control subsystem 8 during the various modes of system operation.

Initially, system control subsystem 8 provides enable signal $E_1=1$ to the object detection subsystem 2. When an object is presented within the object detection field, the object is automatically detected by the object detection subsystem 2. In response thereto, the object detection system automatically generates a control activation signal $A_1=1$. When control activation signal $A_1=1$ is detected by the system control subsystem 8, it automatically activates the laser-based bar code symbol detection subsystem 3 by producing enable signal $E_2$. This causes the laser-based bar code detection subsystem 3 to generate a laser scanning pattern (either an omni-directional multi-line scan pattern or a uni-directional single line scan pattern depending on a control activation signal $A_5$) within the bar code detection field. When the laser scanning pattern scans a bar code symbol on the detected object, scan data signals are produced therefrom, collected and processed to determine whether a bar code symbol is present within the bar code symbol detection field. If the presence of a bar code symbol is detected, then the system control subsystem 8 automatically generates enable $E_3$ so as to activate the bar code symbol reading subsystem 4. In response thereto, the laser-based bar code reading subsystem 4 automatically generates a laser scanning pattern (either an omni-directional multi-line scan pattern or a unidirectional single line scan pattern depending on control activation signal $A_5$) within the bar code reading field, scans the detected bar code symbol disposed therein, collects scan data therefrom, decodes the detected bar code symbol, generates symbol character data representative of the decoded bar code symbol, and buffers the symbol character data in memory. If the detected bar code symbol is read within a predetermined period of time, and the manually-activated data transmission switch 7A is depressed within a predetermined time frame established by the system control subsystem 8, then the system control subsystem 8 automatically activates the data transmission subsystem 5 by producing enable signal $E_5$. In response thereto, the data transmission subsystem 5 automatically transmits the producedibuffered symbol character data to the host system (e.g. electronic cash register system, data collection device, or other data storage/processing device, etc.) over a communication link therebetween (which, for example, may be a wireless data link or wired serial data link (such as an RS-232 link or USB link) or a wired parallel data bus).

In general, the geometrical and optical characteristics of laser scanning patterns generated by the laser-based bar code symbol detection subsystem 3 and the laser-based bar code symbol reading subsystem 4 will depend on the particular design the bar code symbol reading system of the present invention. In most applications, the laser scanning patterns generated within the bar code detection and reading fields will be substantially congruent, and if not substantially congruent, then arranged so that the bar code symbol reading field spatially-overlaps the bar code symbol detection field to improve the scanning efficiency of the system.

By virtue of the novel system control architecture, the user is permitted to read bar code symbols utilizing an omni-directional multi-line scanning pattern or a unidirectional single line scanning pattern in a highly intuitive manner, wherein object detection, bar code detection, and bar code symbol reading are carried out in an automatic manner while data transmission of decoded symbol character data to the host device in the uni-directional scanning mode is enabled by manual-actuation of a switch, button or like device located on the exterior of the hand-supportable scanner housing.

In the preferred embodiment, a visual state indicator is provided on the scanner housing for visually indicating that a bar code symbol has been successfully read in a fully-automatic manner, and that the system is ready for data transmission enablement to the host system or like device in the uni-directional single line scanning mode (or that the system is (or has) performed data transmission to the host system or like device in the omni-directional multiple line scanning mode). In the uni-directional single line scanning mode, when the visual indicator indicates that a bar code symbol is being read and decoded symbol character data is being generated, the user need only depress the data transmission activation switch on the scanner housing within a pre-allotted time frame to send the corresponding symbol character data to the host system or like device. Failure to depress the data transmission switch within the pre-allotted time frame results in there not being any symbol character data transmission to the host system.

Preferably, the laser-based bar code symbol detection subsystem 3 and the laser-based bar code symbol reading subsystem 4 share a common laser scanning platform that is capable of selectively producing an omni-directional multiple line scan pattern or a uni-directional single line scan pattern. A variety of scanning platforms may be alternatively used to selectively produce such omni-directional and single line scan patterns. Generally, these platforms employ a laser diode, the light from which is focused and collimated to form a scanning beam. A scanning mechanism (such as a multi-faceted rotating mirror or rotating holographic disk) directs the scanning beam to a first set of light folding mirrors to produce an omni-directional scan pattern, and directs the scanning beam to a second set of light folding mirrors to produce a single line scan pattern. Reflected laser light that returns back along the outgoing optical path is collected and directed to a detector, which generates electrical signals whose amplitude corresponds to the intensity of the returned light directed thereto. Notably, the scanning mechanism can be realized in a variety of different ways. Thus, the term "scanning mechanism" as used herein is understood as any means for moving, steering, swinging or directing the path of a light beam through space during system operation for the purpose of obtaining information relating to an object and/or a bar code symbol.

Various mechanisms may be provided that enable the laser scanning platform to selectively produce the omni-directional scan pattern or single line scan pattern, including the following:

i) selectively moving the first and second set of light folding mirrors to spatially arrange either the first or second set of mirrors into operating position;

ii) movement of an optical control element into the optical path of the scanning beam between the laser diode and the rotating mirror; when activated, the optical control element causes the scanning beam to be directed to the second set of light folding mirrors (or the first set of light folding mirrors); and iii) selectively moving the rotating mirror so that is in operating position with respect to either the first or second set of light folding mirrors.

An alternative mechanism controls the duty cycle of the laser diode to thereby produce either the omni-directional scan pattern or the single line scan pattern. Such a mechanism is suitable for configurations where the second set of light folding mirrors (which is used to produce the single scan line) is a subset of the first set of light folding mirrors (which is used to produce the omni-directional scan pattern). In this configuration, by turning the laser diode on continuously, the rotating mirror directs the scanning beam to the first set of light folding mirrors to produce the omni-directional scan pattern. By turning the laser diode on only during those intervals when the scanning beam strikes the second set of light folding mirrors, the rotating mirror directs the scanning beam to the second set of light folding mirrors to produce the single line scan pattern. This alternative mechanism requires that the duty cycle (on/off cycle)

of the laser diode be synchronized to a particular interval in the rotation cycle of the rotating mirror (or rotating holographic disk) wherein the rotating mirror directs the scanning beam to the second set of light folding mirrors.

Such synchronization may be derived from a position sensor (such as a hall sensor), integrated into the rotating shaft (or other portion) of the rotating mirror (or rotating holographic disk), that generates an electrical signal when the rotating mirror (or rotating holographic disk) reaches a predetermined point (such as a start-of-scan position) in its rotation. Alternatively, such synchronization may be derived from a position indicating optical element (e.g., mirror or lens), which is preferably mounted adjacent (or near) the perimeter of one of the light folding mirrors, such that the position indicating optical element is illuminated by the scanning beam when the rotating mirror (or rotating holographic disk) reaches a predetermined point (such as a start-of-scan position) in its rotation. The position indicating optical element may be a mirror that directs the illumination of the scanning beam incident thereon to a position indicating optical detector (which generates an electrical signal whose amplitude corresponds to the intensity of light incident thereon). Alternatively, the position indicating optical element may be a light collecting lens that is operably coupled to a light guide (such as a fiber optic bundle) that directs the illumination of the scanning beam incident thereon to a position indicating optical detector (which generates an electrical signal whose amplitude corresponds to the intensity of light incident thereon).

Figure 4B:
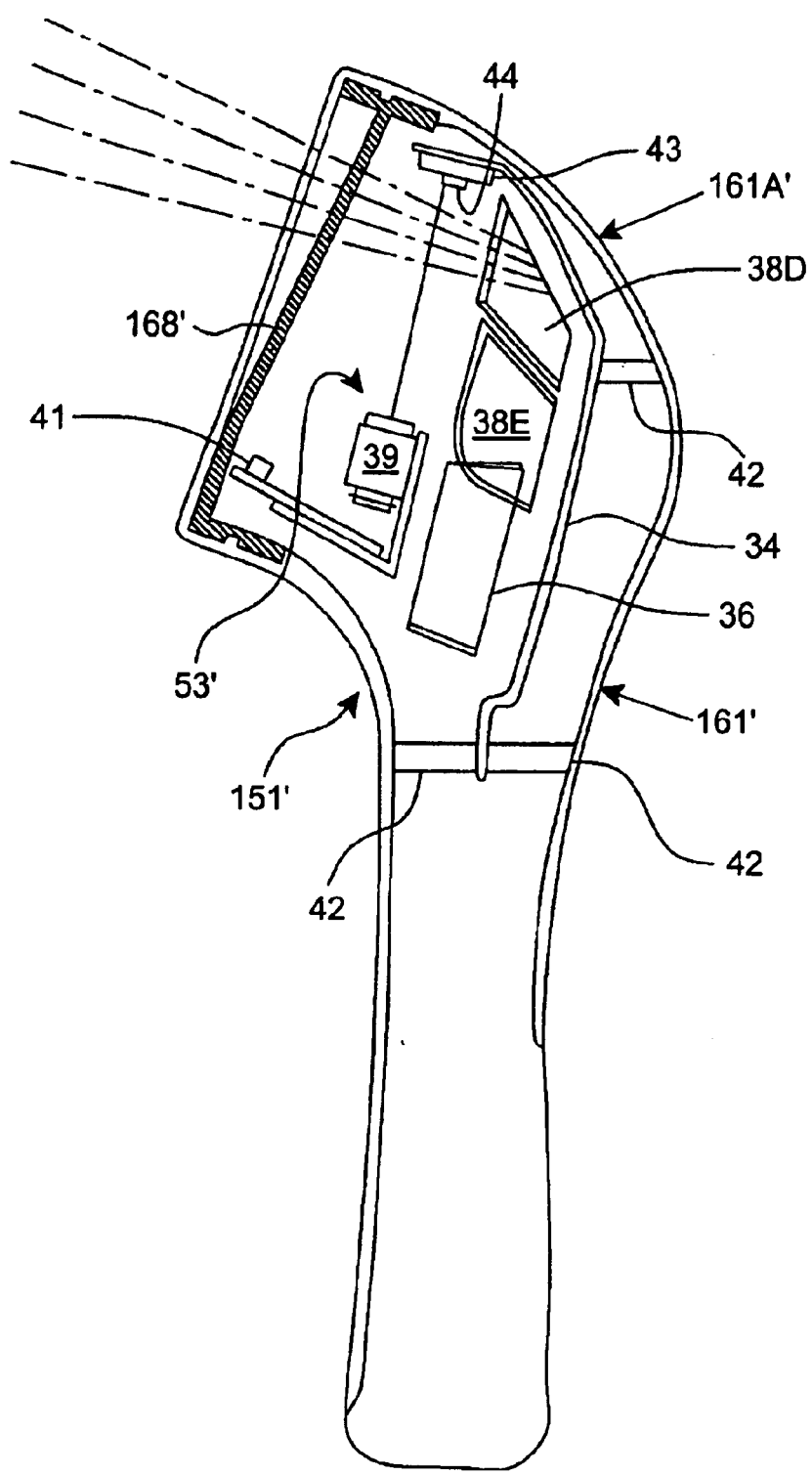

FIGS. 4A and 4B illustrate an exemplary laser scanning platform that employs a mechanism that controls the duty cycle of a laser light source (e.g., laser diode) to selectively produce an omni-directional scan pattern or the single line scan pattern. As shown in FIG. 4A, the laser scanning platform 53' comprises an assembly of subcomponents assembled upon an optical bench 34 with respect to a central longitudinal reference plane 35. The optical bench is mounted to the housing 161' of the device 151' by posts 42. This subcomponent assembly includes a scanning polygon 36 having four light reflective surfaces (e.g., facets) 36A, 36B, 36C and 36D, each disposed at an tilt angle β with respect to the rotational axis of the polygon as shown in FIG. 4F. An electrical motor is mounted on the optical bench 34 and has a rotatable shaft on which polygon 36 is mounted for rotation therewith. An array of stationary mirrors 38A, 3813, 38C, 38D and 38E is fixedly mounted with supports (not shown) to the optical bench 34 at twist and bend angles α, θ as shown in FIGS. 4A and 4E.

As shown in FIG. 4B, a laser beam production module 39 is fixedly mounted above the rotating polygon 36 with supports (not shown) and produces a laser beam having a circularized beam cross-section and essentially free of astigmatism along its length of propagation. The laser beam production module 39 may be realized in a variety of ways. Preferably, it comprises a visible laser diode for producing a visible laser beam, and associated optics for circularizing the laser beam and eliminating astigmatism therefrom along its direction of propagation. For example, the associated optics may include an aspheric collimating lens, a beam circularizing prism, and a holographic light diffractive grating configured in such a manner that the abovedescribed functions are realized during laser beam production. The manner in which such a laser beam production module can be constructed without the use of aperture stops is taught in WIPO Publication WO9957579A2 entitled "DOE-Based Systems and Devices for Producing Laser Beams Having Modified Beam Characteristics", published commonly assigned to the assignee of the present invention, herein incorporated by reference in its entirety.

In the omni-directional scan mode of operation, the duty cycle of the laser light source of the laser beam production module is controlled so that the laser beam is continuously produced therefrom and directed to rotating polygon 36, which cooperates with the full array of stationary mirrors 38A, 38B, 38C, 38D and 38E to produce an omni-directional scan pattern that passes through transmission window 168'.

In the uni-directional (single scan line) scan mode of operation, the duty cycle of the laser light source of the laser beam production module is controlled so that the laser beam is produced therefrom only during those intervals when the laser beam (as redirected by the rotating polygon 36) strikes the central stationary mirror 38C, thereby producing a uni-directional single line scan pattern that passes through transmission window 168'.

The particular parameters (and associated geometric model) used to configure the optical components of the laser scanning platform are described in detail in U.S. Pat. No. 5,844,227 to Schmidt et al., commonly assigned to the assignee of the present invention, and incorporated by reference above in its entirety.

As shown in FIG. 4B, an analog signal processing board 40 is fixedly mounted over the rotating polygon 36 with supports (not shown), and carries one or more photodetector 41 (e.g., silicon photosensor(s)) that detects reflected laser light and producing analog scan data signals in addition to analog signal processing control circuits 42 (not shown) for performing various functions, including analog scan data signal processing. In addition, the analog signal processing board 40 preferably includes visible laser diode drive circuitry (not shown), motor drive circuitry (not shown), object sensing circuitry (e.g., an infra-red light source, such as an infra-red LED, associated drive circuitry, and infra-red light detection circuitry) and associated object detect circuitry, the functions of which are described in greater detail hereinafter.

A light collecting mirror 43 is disposed at a height above the central stationary mirror 38C and collects returning light rays reflected off the rotating polygon 36 and focuses the same onto the photodetector 41. A beam directing surface 44, realized as a flat mirror mounted on the light collecting mirror 43, directs the laser beam from the laser beam production module 39 to the rotating polygon 36.

The uni-directional (single scan line) scan mode of operation requires that the duty cycle (on/off cycle) of the laser light source of the laser beam production module 39 be synchronized to the particular interval in the rotation cycle of the rotating polygon 36 wherein the rotating polygon 36 directs the scanning laser beam to the central stationary mirror 38C. FIGS. 4C and 4D1 and 4D2 illustrative alternative configurations that provide such synchronization.

Figure 4C:
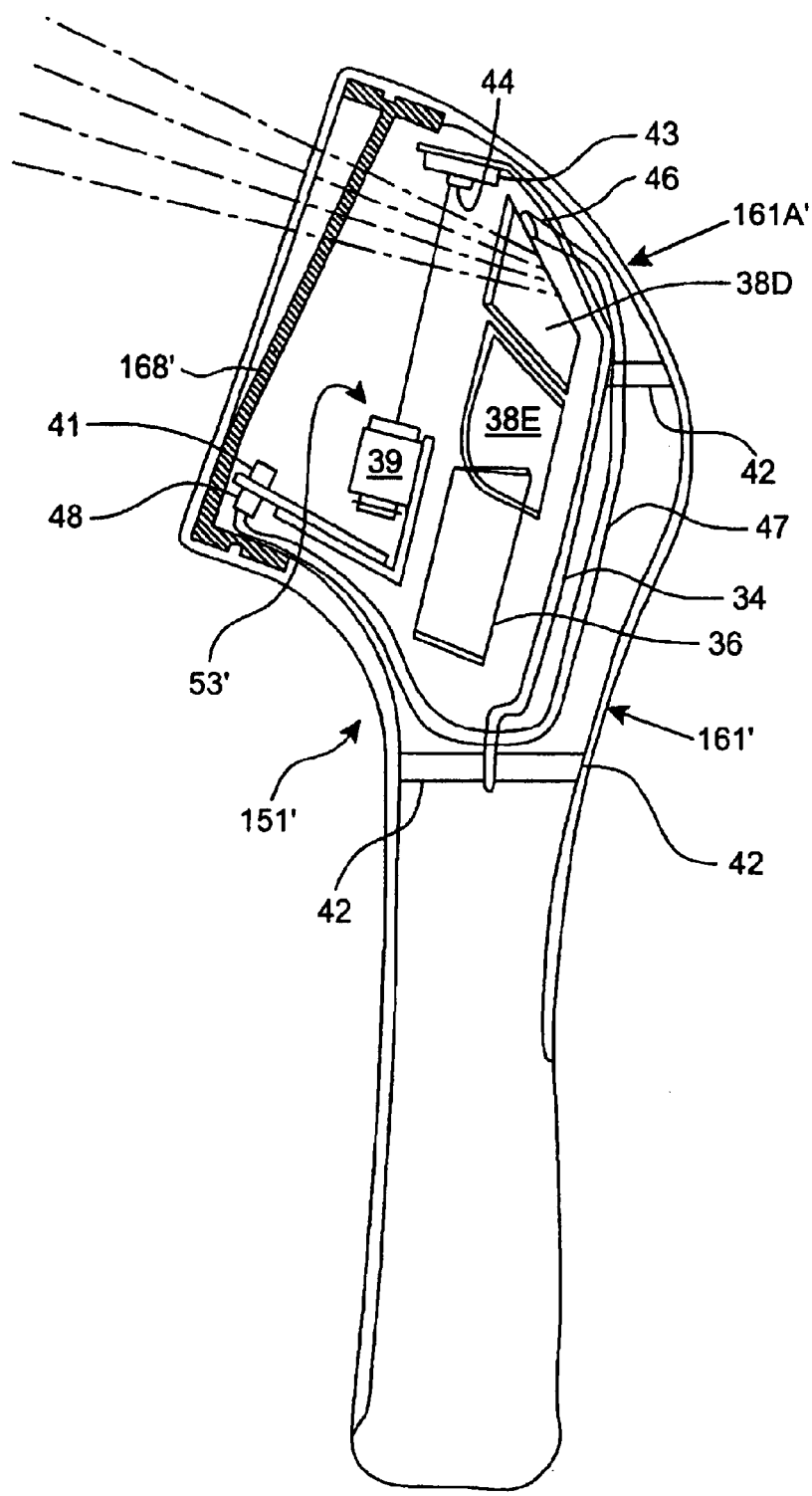

As shown in FIG. 4C, a position indicating lens 46 is mounted between the perimeter of stationary mirrors 38D and 38C such that the position indicating lens 46 is illuminated by the scanning beam when the rotating polygon 36 reaches a predetermined point (denoted start-of-scan position) in its rotation. The positioning indicating lens 46 is operably coupled to a light guide 47 (such as a fiber optic bundle) that directs the illumination of the laser beam incident thereon to a position indicating optical detector 48 (which generates an electrical signal whose amplitude corresponds to the intensity of light incident thereon). Timing signals that are synchronized to the time interval when the laser beam (as redirected by the rotating polygon 36) strikes the central stationary mirror 38C are derived from the electrical signals generated by detector 48. In the unidirectional (single scan line) scan mode of operation, such timing signals are used to control the duty cycle of the laser light source of the laser beam production module 39 such that the laser beam is produced therefrom only during those intervals when the laser beam (as redirected by the rotating polygon 36) strikes the central stationary mirror 38C.

As shown in 4D1 and 4D2, a position indicating mirror 49 is mounted between the perimeter of stationary mirrors 38D and 38C such that the position indicating mirror 49 is illuminated by the scanning beam when the rotating polygon 36 reaches a predetermined point (denoted start-of-scan position) in its rotation. The positioning indicating mirror 49 is oriented such that it directs the illumination of the laser beam incident thereon along a position indicating reference axis 50 (which is offset with respect to the central reference axis 35 as shown) to position indicating optical detector 48 (which generates an electrical signal whose amplitude corresponds to the intensity of light incident thereon). Timing signals (that are synchronized to the time interval when the laser beam (as redirected by the rotating polygon 36) strikes the central stationary mirror 38C) are derived from the electrical signals generated by detector 48. In the unidirectional (single scan line) scan mode of operation, such timing signals are used to control the duty cycle of the laser light source of the laser beam production module 39 such that the laser beam is produced therefrom only during those intervals when the laser beam (as redirected by the rotating polygon 36) strikes the central stationary mirror 38C.

Alternatively, such synchronization may be derived from a position sensor (such as a hall sensor), integrated into the rotating shaft (or other portion) of the rotating polygon 36, that generates an electrical signal when the rotating mirror (or rotating holographic disk) reaches a predetermined point (such as a start-of-scan position) in its rotation.

Figure 5A:
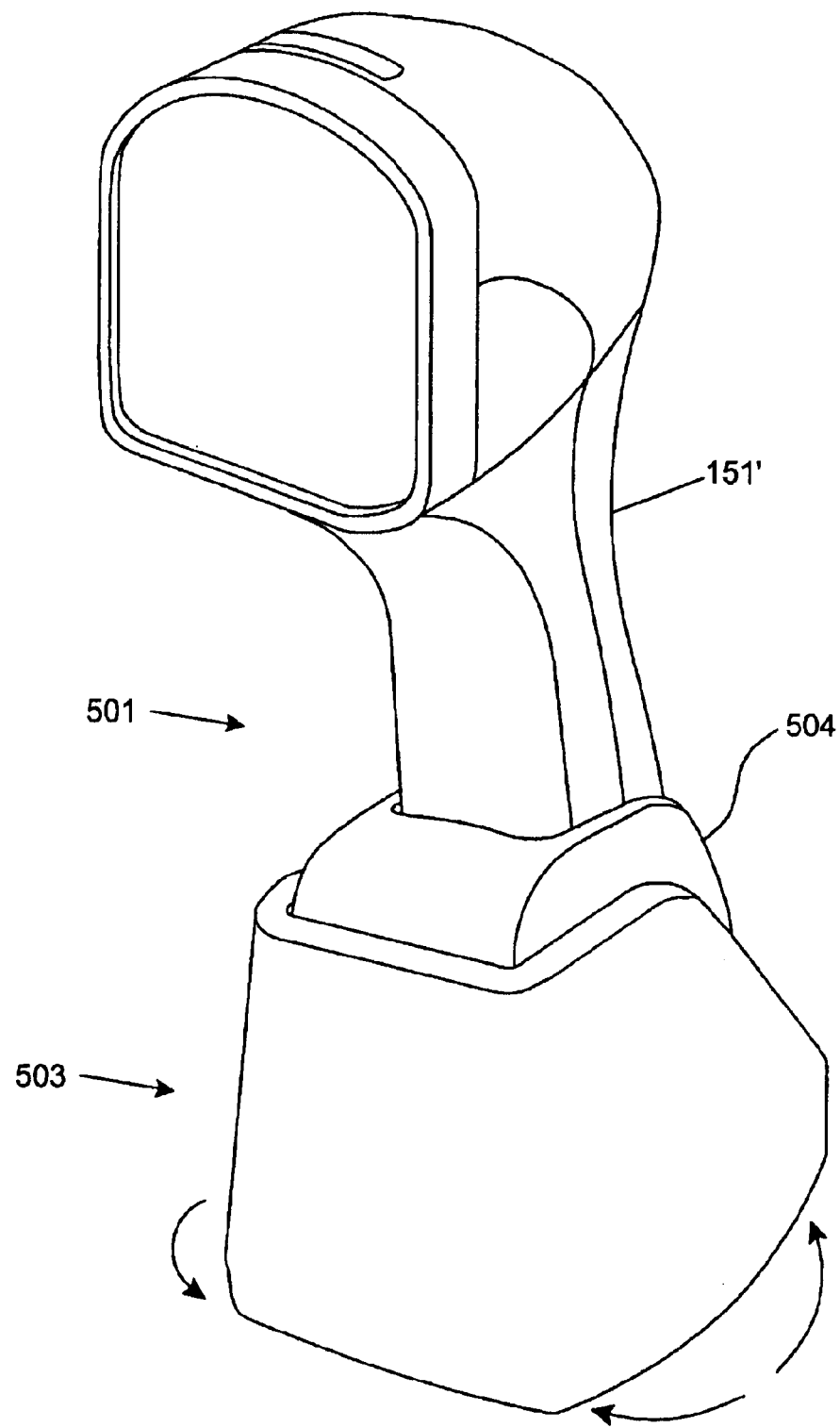
FIGS. 5A, 5B, 5C and 5D illustrate an exemplary automatically-activated hand-holdable bar code symbol reading system according to the present invention including an automatic (i.e., trigger less) hand-holdable bar code symbol reading device 151' operably associated with a base unit 503 having a scanner support 504 pivotally connected thereto, for releasably supporting the automatic bar code symbol reading device 151' at any one of a number of positions above of a counter surface at a Point of Sale (POS) station. The scanner support 504 is particularly adapted for receiving and supporting the hand-holdable bar code symbol reading device 151' without user support, thus providing a stationary, automatic hands-free mode of operation.

The structure and functionalities of the system design of FIG. 3 as described above are shown in greater detail in the system embodiment of FIGS. 5A through 9F. As shown in FIG. 5A, an automatic bar code symbol reading system 501 of the illustrative embodiment of the present invention comprises an automatically-activated (i.e., trigger less) hand-holdable bar code symbol reading device 151' operably associated with a base unit 503 having a scanner support 504 pivotally connected thereto, for releasably supporting the automatic bar code symbol reading device 151' at any one of a number of positions above of a counter surface at a Point of Sale (POS) station. In the preferred embodiment, the bar code symbol reading device 151' is operably coupled with its the base unit 503 by way of a one way wireless communication link therebetween, and the base unit 503 is operably coupled with a host system (e.g., electronic cash register system, data collection device, etc.) by way of a two way wired communication link (such as a serial communication link over a communications cable). In this preferred embodiment, bar code symbol data generated by device 151' is communicated over the wireless communication link to the base unit 503, which forwards the data to the host system over the two way wired communications link. Alternatively, the bar code symbol reading device 151' may be operably coupled directly with the host system by way of a two way wireless (or wired) communication link. In this alternative embodiment, bar code symbol data generated by device 151' is communicated over the wireless (or wired) link to the host system.

In this illustrative embodiment, electrical power from a low voltage direct current (DC) power supply (not shown) is provided to the base unit 503. Notably, this DC power supply can be realized in host computer system or as a separate DC power supply adapter pluggable into a conventional 3-prong electrical socket. Such electric power is operably coupled to a rechargeable battery power supply unit 20 that is contained primarily within the handle portion of the bar code symbol reading device 151' in order to energize the electrical and electro-optical components within the device 151'. The details of the rechargeable battery power supply unit 20 is described in U.S. Pat. No. 5,844,227 to Schmidt et al.

Figure 5B:
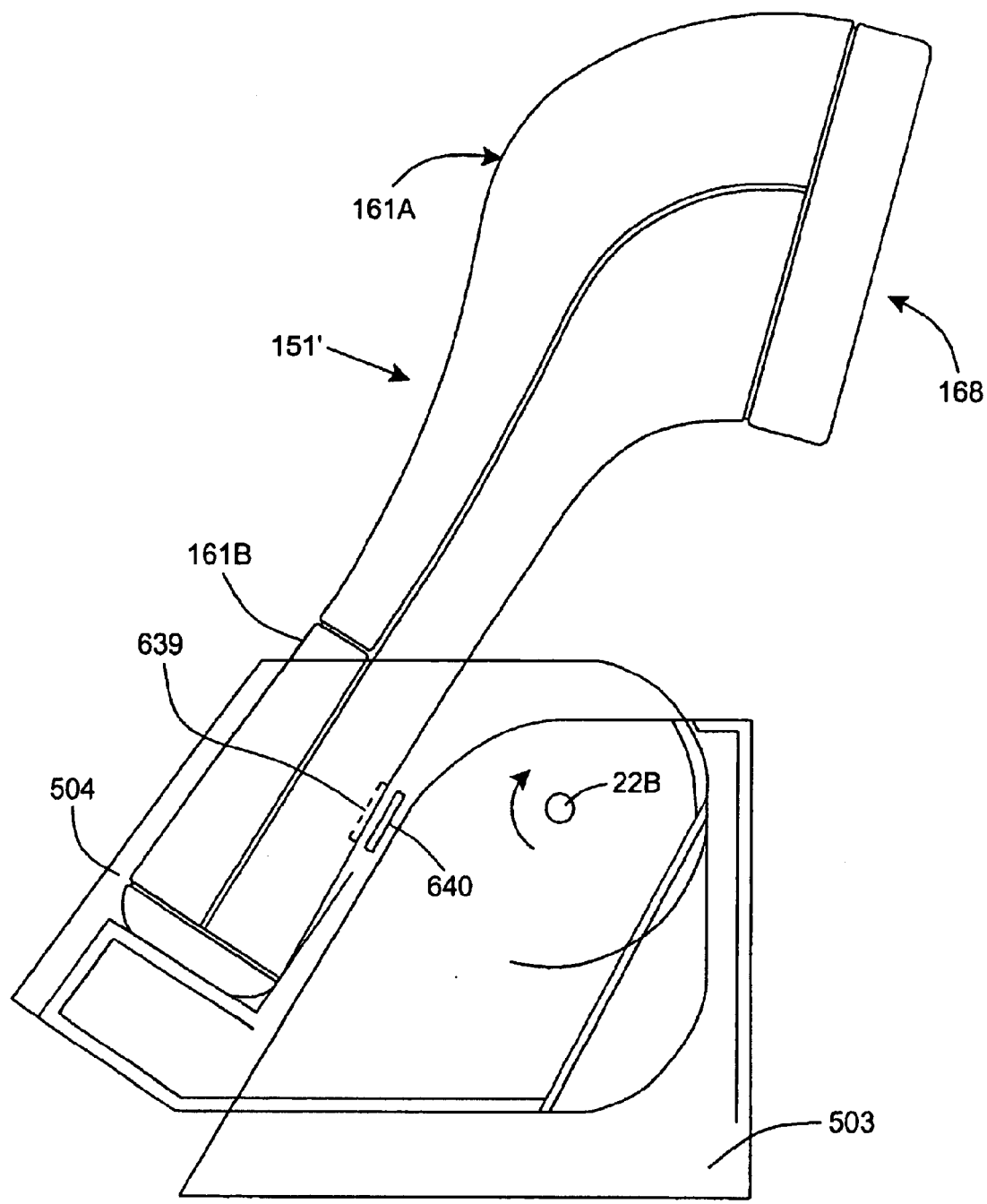

As illustrated in FIGS. 5A and 5B, the scanner support 504 is particularly adapted for receiving and supporting the hand-holdable bar code symbol reading device 151' without user support, thus providing a stationary, automatic hands-free mode of operation. The base unit 503 can be realized as a compact stand for support upon a countertop surface, or can be realized as a support mount for vertical wall-mounting. In either configuration, the function of the scanner stand 504 is to support the device 151' in one or more positions above a workspace (which may be a counter surface in POS applications). In the preferred embodiment, the base unit 503 contains electronic circuitry realized on a PC board for carrying out various types of functions, namely: reception of electrical power from the host system and coupling electrical power to the rechargeable battery contained within the device 151'; reception of bar code symbol character data (e.g., data packets) transmitted from the device 151', and processing the same for data recovery; generation of acoustical and/or optical acknowledgement signals; and forwarding of received bar code symbol character data to the host system.

As shown in FIG. 5B, preferably the scanner stand 504 is pivotally supported with respect to the base unit 503 by way of pivot pins (one shown as 522B). In order to releasably pivot (and hold) the stand 504 relative to the base 503 in any one of a number of provided scanning positions, a releasable stand-locking mechanism may be provided, the details of which is described in U.S. Pat. No. 5,844,227 to Schmidt et al.

Figure 5C:
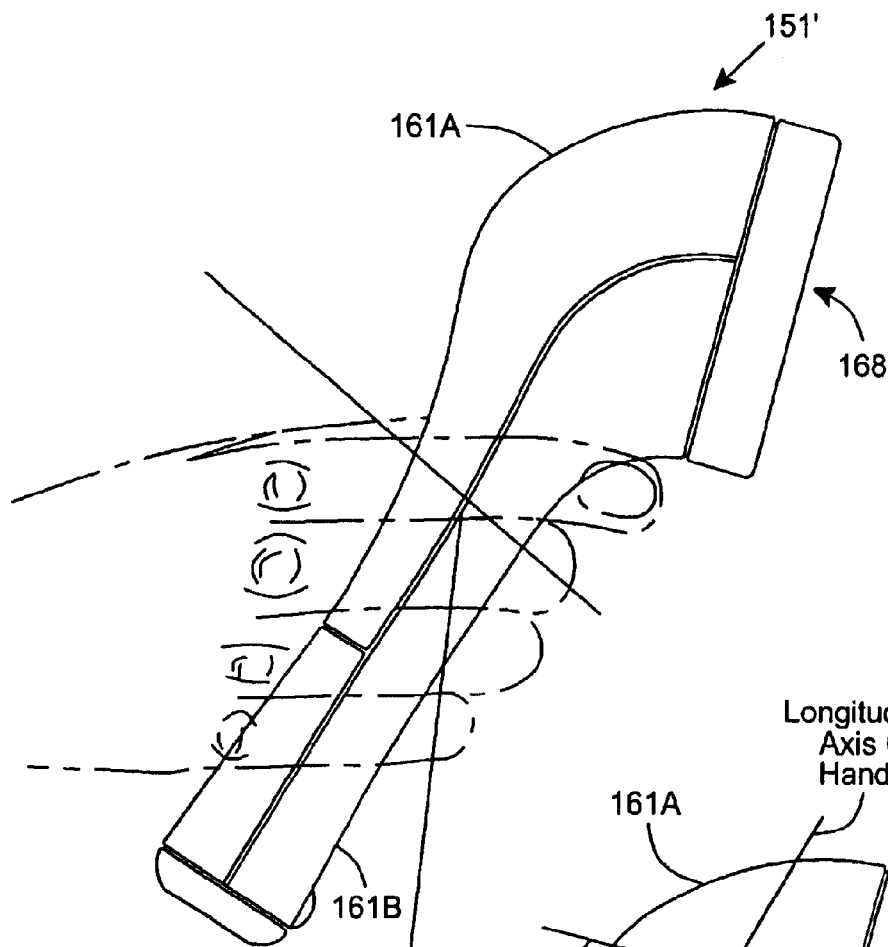
Figure 5D:
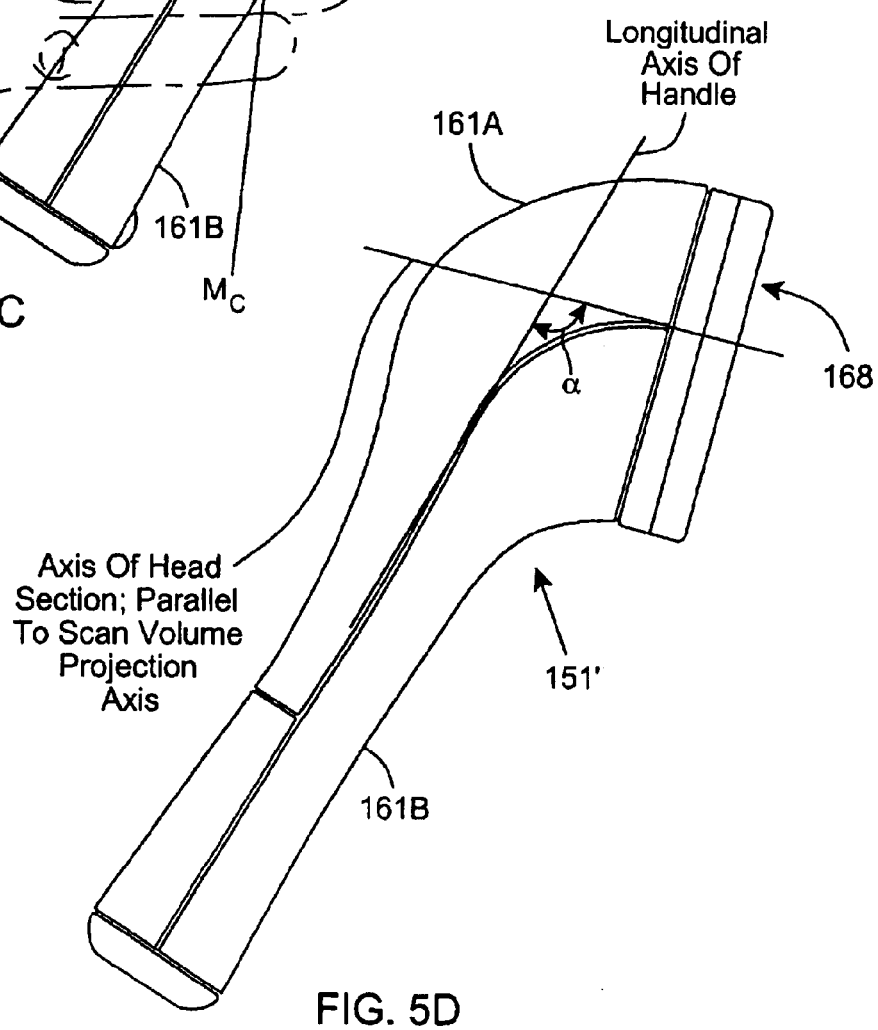

As illustrated in FIGS. 5C and 5D, the head portion 161A of the device 151' continuously extends into contoured handle portion 161B at an obtuse angle $\alpha$ (which, in the illustrative embodiment, is about 115 degrees). It is understood, however, that in other embodiments obtuse angle $\alpha$ may be in the range of about 100 to about 150 degrees. As illustrated in FIG. 5C, the mass balance of the device 151' is particularly designed so that when the device is held within the user's hand, the index finger of the user is disposed beneath the head portion 161A of the housing, and provides a pivot point about which there is substantially zero torque acting upon the device, preventing it from rotating in either direction about the index finger. Instead, the resultant force distribution acting upon the user's hand is aligned in the direction of gravitational forces, as indicted in FIG. 5C. The effect of this mass-balanced scanner design is to minimize the torque imposed on the user's wrists and forearms while using the bar code symbol reading device in the hands-on mode of operation. This, in turn, minimizes the amount of energy which the user must expend during hands-on scanning operations, thereby reducing wrist and arm fatigue and increasing worker productivity. In addition to the above advantages, the hand-supportable housing hereof is sculptured (i.e., form-fitted) to the human hand so that automatic hands-on scanning is rendered easy and effortless. Also, the ergonomic housing design eliminates the risks of musculoskeletal disorders, such as carpal tunnel syndrome, which can result from repeated biomechanical stress commonly associated with pointing prior art gunshaped scanners at bar code symbols, and squeezing a trigger to activate the laser scanning beam, and then releasing the trigger.

In this illustrative embodiment, the bar code symbol reading device 151' includes the laser scanning platform (described above with respect to FIGS. 4A to 4D2) mounted within its housing by way of resiliently securing shock-mounting support posts to corresponding mounting holes formed within the optical bench 35 using rubber grommets and screws. The details of this shock absorbing mounting mechanisms described in U.S. Pat. No. 5,844,227 to Schmidt et al. Moreover, the housing of the device 151' is preferably realizes as a five-piece split-housing construction, the details of which is described in U.S. Pat. No. 5,844,227 to Schmidt et al.

Figure 6A:
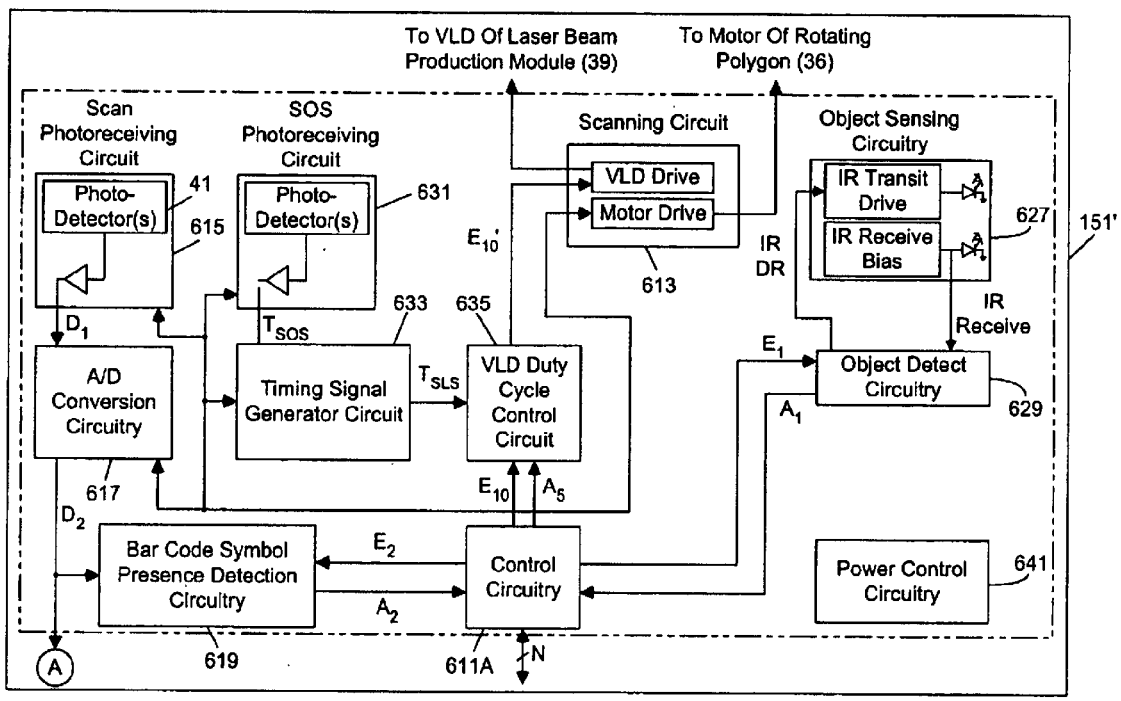
FIGS. 6A and 6B illustrate an exemplary system design of an automatically-activated hand-holdable bar code symbol reading device 151' according to the present invention, including a number of cooperating components, namely: control circuitry 611A and a control module 611B that cooperate to perform system control operations to effectuate the system control; a scanning circuit 613 that drives the VLD and laser beam scanning mechanism (e.g., motor of rotating polygon of the laser scanning platform) to thereby produce an omni-directional multiple line scan (or uni-directional single line scan) of a visible laser beam; a scan photoreceiving circuit 615 for detecting laser light reflected off a scanned bar code symbol and producing an electrical signal $D_1$ indicative of the detected intensity; an analog-to-digital (A/D) conversion circuit 617 for converting analog scan data signal $D_1$ into a corresponding digital scan data signal $D_2$; a bar code symbol presence detection circuit 619 for processing digital scan data signal $D_2$ in order to automatically detect the digital data pattern of a bar code symbol on the detected object and produce control activation signal $A_2$; a symbol decoding module 621 for processing digital scan data signal $D_2$ so as to determine the data represented by the detected bar code symbol, generate symbol character data representative thereof, and produce activation control signal $A_3$; a data packet synthesis module 623 for synthesizing a group of formatted data packets (that include the symbol character data generated by the symbol decoding module); a data packet transmission circuit 625 for transmitting the group of data packets synthesized by the data packet synthesis module 623 to the base unit 503 (for retransmission to the host device); means (e.g. an object sensing circuit 627 and an object detection circuit 629) for producing a first activation control signal indicative of the detection of an object in at least a portion of the object detection field of the device; an SOS photoreceiving circuit 631 for detecting laser light directed thereto by positioning indicating optical element(s) (such as a lens and light guide or mirror as described above) and deriving timing signal $T_{SOS}$ that is synchronized thereto; a timing signal generator circuit 633 that derives a timing signal $T_{SLS}$ from the timing signal $T_{SOS}$, wherein the timing signal $T_{SLS}$ is synchronized to the time interval when the laser beam (as redirected by the rotating polygon) provides the uni-directional single line scan (e.g., strikes the central stationary mirror 38C); a VLD duty cycle control circuit 635 that operates (under control of the control circuitry 611A) in the uni-directional (single scan line) scan mode of operation, to control the duty cycle of the VLD of the laser beam production module such that the laser beam is produced therefrom only during those intervals when the laser beam (as redirected by the rotating polygon 36) provides the uni-directional single line scan (e.g., strikes the central stationary mirror 38C); a manually-actuatable data transmission switch 637 for generating control activation signal $A_4$ in response to activation of the switch 637; a mode switch 639 for generating control activation signal $A_5$ in response to activation of the switch 639; state indications (e.g. LEDs) 170' that provide a visible indication of the operating state (e.g., object detection state, a bar code symbol presence detection state, bar code symbol reading state, and data transmission state) of the device 151'; and a power control circuit 641, operably coupled to the rechargeable battery supply unit (not shown) of the device 151', that automatically controls (i.e. manages) the availability of battery power to electrically-active components within the bar code symbol reading device when the device is operated in its hands-on mode of operation (i.e. removed from the scanner support stand) under a predefined set of operating conditions.
Figure 6B:
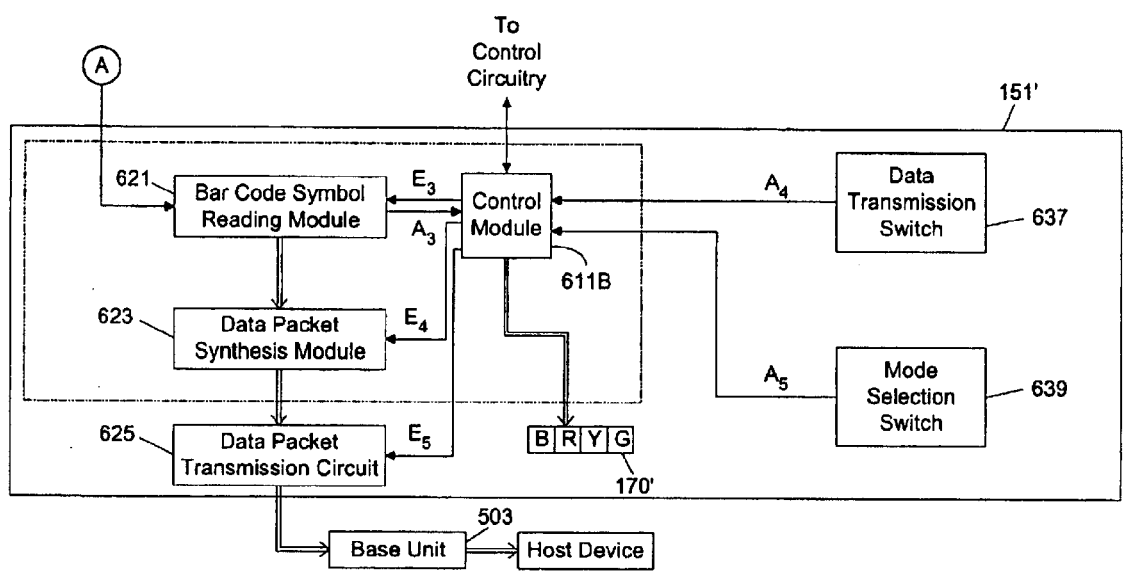

FIGS. 6A and 6B illustrate an exemplary system design of the hand-holdable bar code symbol reading system 151' including a number of cooperating components, namely: control circuitry 611A and a control module 611B that cooperate to perform system control operations to effectuate the system control as described below in more detail with reference to FIGS. 8 through 9D; a scanning circuit 613 that drives the VLD and laser beam scanning mechanism (e.g., motor of rotating polygon of the laser scanning platform) to thereby produce an omni-directional multiple line scan (or unidirectional single line scan) of a visible laser beam; a scan photoreceiving circuit 615 for detecting laser light reflected off a scanned bar code symbol and producing an electrical signal $D_1$ indicative of the detected intensity; an analog-to-digital (A/D) conversion circuit 617 for converting analog scan data signal $D_1$ into a corresponding digital scan data signal $D_2$; a bar code symbol presence detection circuit 619 for processing digital scan data signal $D_2$ in order to automatically detect the digital data pattern of a bar code symbol on the detected object and produce control activation signal $A_2$; a symbol decoding module 621 for processing digital scan data signal $D_2$ so as to determine the data represented by the detected bar code symbol, generate symbol character data representative thereof, and produce activation control signal $A_3$; a data packet synthesis module 623 for synthesizing a group of formatted data packets (that include the symbol character data generated by the symbol decoding module); a data packet transmission circuit 625 for transmitting the group of data packets synthesized by the data packet synthesis module 623 to the base unit 503 (for retransmission to the host device); means (e.g. an object sensing circuit 627 and an object detection circuit 629) for producing a first activation control signal indicative of the detection of an object in at least a portion of the object detection field of the device; an SOS photoreceiving circuit 631 for detecting laser light directed thereto by positioning indicating optical element(s) (such as a lens and light guide or mirror as described above) and deriving timing signal $T_{SOS}$ that is synchronized thereto; a timing signal generator circuit 633 that derives a timing signal $T_{SLS}$ from the timing signal $T_{SOS}$, wherein the timing signal $T_{SLS}$ is synchronized to the time interval when the laser beam (as redirected by the rotating polygon) provides the uni-directional single line scan (e.g., strikes the central stationary mirror 38C); a VLD duty cycle control circuit 635 that operates (under control of the control circuitry 611A) in the unidirectional (single scan line) scan mode of operation, to control the duty cycle of the VLD of the laser beam production module such that the laser beam is produced therefrom only during those intervals when the laser beam (as redirected by the rotating polygon 36) provides the uni-directional single line scan (e.g., strikes the central stationary mirror 38C); a manually-actuatable data transmission switch 637 for generating control activation signal $A_4$ in response to activation of the switch 637; a mode switch 639 for generating control activation signal $A_5$ in response to activation of the switch 639; state indications (e.g. LEDs) 170' that provide a visible indication of the operating state (e.g., object detection state, a bar code symbol presence detection state, bar code symbol reading state, and data transmission state) of the device 151'; and a power control circuit 641, operably coupled to the rechargeable battery supply unit (not shown) of the device 151', that automatically controls (i.e. manages) the availability of battery power to electrically-active components within the bar code symbol reading device when the device is operated in its hands-on mode of operation (i.e. removed from the scanner support stand) under a predefined set of operating conditions.

The control circuitry 611A, which preferably includes RC timing networks (e.g. timers) and logic, operates under control of the control module 611B to perform system control operations in activating/deactivating the object detection circuit 307 (e.g., by generating enable signal $E_1=1/E_1=0$, respectively); activating/deactivating scan photoreceiving circuit 615, A/D conversion circuit 617, the SOS photoreceiving circuit 631, timing signal generator circuit 633, VLD duty cycle control circuit 635, and the scan mechanism drive control of the scanning circuit 613 ((e.g., by generating enable signal $E_{10}=1/E_{10}=0$, respectively), and activating/deactivating the bar code symbol presence detection circuit 619 (e.g., by generating enable signal $E_2=1/E_2=0$, respectively). The control circuitry 611A performs such system control operations in response to the control activation signals $A_1$ and $A_2$ provided thereto by the object detect circuitry 629 and the bar code symbol presence detection circuitry 619, respectively. Exemplary implementations of such control circuitry 611A is described in detail in U.S. Pat. No. 6,283,375 to Wilz, Sr. et al., herein incorporated by reference in its entirety.

The control module 611B, which is preferably realized using a programmable device (such as a microprocessor (or microcontroller) having accessible program memory and buffer memory and external timing circuitry) operates to perform system control operations in controlling the operation of the first control circuitry 611A, activating/deactivating the bar code symbol reading module 621 (e.g., by generating enable signal $E_3=1/E_3=0$, respectively), activating/deactivating the data packet synthesis module 623 (e.g., by generating enable signal $E_4=1/E_4=0$, respectively), activating/deactivating the data packet transmission circuit 625 (e.g., by generating enable signal $E_5=1/E_5=0$, respectively). The control module 611B performs such system control operations in response to the control activation signals $A_3$, $A_4$ and $A_5$ provided thereto by the bar code symbol reading module 621, the data transmission switch 637 and the mode select switch 639, respectively.

In the illustrative embodiment, scan photoreceiving circuit 615 generally comprises one or more photodetector(s) (e.g. a silicon photosensor) for detecting laser light focused thereon by the light collection optics of the scanning platform. In response to the reflected laser light focused onto the photodetector(s), the photodetector(s) produce an analog electrical signal which is proportional to the intensity of the detected laser light. This analog signal is subsequently amplified by a preamplifier to produce analog scan data signal $D_1$. In short, the laser scanning circuit 613 and scan photoreceiving circuit 615 cooperate to generate analog scan data signals $D_1$ from the scanning field (i.e. bar code detection and reading fields), over time intervals specified by the control circuitry 611A and/or control module 611B (e.g., time intervals when such components are activated by enable signal $E_{10}$=1). In addition, an optical filter having transmission characteristics tuned to the characteristic wavelength range of the light source used for scanning may be mounted in front of the photodetector(s) of the scan photo-receiving circuit 615 as described below in detail. This optical configuration improves the signal-to-noise ratio of the analog scan signal $D_1$ produced by the scan photoreceiving circuit 615.

The analog scan data signal $D_1$ is provided as input to A/D conversion circuit 617 that operates over time intervals specified by the control circuitry 611A and/or control module 611B (e.g., time intervals when the A/D conversion circuit 617 is activated by enable signal $E_{10}$=1) in a manner well known in the art to process analog scan data signal $D_1$ to provide a digital scan data signal $D_2$, which has a waveform that resembles a pulse width modulated signal, where the logical "1" signal levels represent spaces of the scanned bar code symbol and the logical "0" signal levels represent bars of the scanned bar code symbol. The A/D conversion circuit 617 can be realized using any conventional A/D conversion technique well known in the art. Digitized scan data signal $D_2$ is then provided as input to bar code symbol presence detection circuit 619 and bar code symbol reading module 621 for use in performing particular functions required during the bar code symbol reading process of the present invention.

In accordance with the present invention, the purpose of object detection circuit 629 is to produce a first control activation signal $A_1$=1 upon determining that an object (e.g. product, document, etc.) is present within the object detection field of the bar code symbol reading device 151' over time intervals specified by the control circuitry 611A and/or control module 611B (e.g., time intervals when the object detection circuit 629 is activated by enable signal $E_1$=1). In the illustrative embodiment automatic object detection is employed. It is understood, however, that "passive" techniques may be used with acceptable results. In the illustrative embodiment, object sensing circuit 627 comprises an IR LED driven by an IR transmitter drive circuit, and an IR phototransistor (or photodiode) activated by an IR receive biasing circuit. These components are arranged and mounted on the PC board so as to provide an object detection field that spatially encompasses the laser scanning plane. When activated, the object detection circuit 629 produces an enable signal IR DR which is provided to the IR transmitter drive circuit. The signal produced from IR phototransistor, identified as IR Receive, is provided as input signal to the object detection circuit 629 for signal processing that detects whether an object is present within the object detection field. A more detailed description of exemplary signal processing mechanisms for object detection is set forth in U.S. Pat. No. 6,283,375 to Wilz Sr. et al. In the illustrative embodiment, IR LED generates a 900 nanometer signal that is pulsed at the rate of 1.0 kHz when the object detection circuit 629 is enabled by enable signal El produced from control circuitry 611A. Preferably, the duty cycle of such pulsed IR light is less than 1.0% in order to keep the average current consumption very low. Alternately, the bar code symbol reading device 151' can be readily adapted to utilize ultrasonic energy for object detection whereby the reflection of ultrasonic energy off an object in the object detection field is detected and signals corresponding thereto are processed as described in U.S. Pat. No. 6,283,375 to Wilz Sr. et al.

The primary purpose of bar code symbol presence detection circuit 619 is to determine whether a bar code symbol is present in (or absent from) the bar code symbol detection field of the device 151' over time intervals specified by the control circuitry 611A and/or control module 611B (e.g., time intervals when the bar code symbol presence detection circuit 619 is activated by enable signal $E_2$=1). In the illustrative embodiment, bar code symbol detection circuit 619 indirectly detects the presence of a bar code in the bar code symbol detection field by detecting a bar code symbol "envelope". In the illustrative embodiment, a bar code symbol envelope is deemed present in the bar code symbol detection field upon detecting a corresponding digital pulse sequence in digital signal $D_2$ which is produced by A/D conversion circuit 617. This digital pulse sequence detection process is achieved by counting the number of digital pulse transitions (i.e. falling pulse edges) that occur in digital scan data signal $D_2$ within a predetermined time period. A more detailed description of exemplary signal processing mechanisms for detecting a bar code symbol "envelope" is set forth in U.S. Pat. No. 6,283,375 to Wilz Sr. et al.

The bar code symbol reading module 621, which is preferably realized using a programmable device (such as a microprocessor (or microcontroller) having accessible program memory and buffer memory and external timing circuitry), operates over time intervals specified by the control module 611B (e.g., time intervals when the bar code symbol reading module is activated by enable signal $E_3$=1) to process, scan line by scan line, the stream of digital scan data contained in the signal $D_2$ in an attempt to decode a bar code symbol therein. Upon successful decoding of a bar code symbol, the bar code symbol reading module produces symbol character data (representative of the decoded bar code symbol and typically in ASCII format).

The data packet synthesis module 623 operates over time intervals specified by the control module 611B (e.g., time intervals when the data packet synthesis module is activated by enable signal $E_4$=1) to synthesize a group of data packets that encode the symbol character data produced by the bar code symbol reading module 621 for subsequent transmission to the base unit 503 by way of data packet transmission circuit 625. The construction of the data packet synthesis module 623 and data transmission circuit 625 will vary from embodiment to embodiment, depending on the type of data communication protocol being used in the particular embodiment of the bar code symbol reading device 151'.

The data transmission circuit 625 operates over time intervals specified by the control module 611B (e.g., time intervals when the data transmission circuit 625 is activated by enable signal $E_5$=1) to transmit the data packets produced by the data packet synthesis module 623 to the base unit 503, which forwards such data to the host device over a communication link therebetween. A more detailed description of the operation of the communication interfaces between the bar code symbol reading device 151' and base unit 503 and between the base unit 503 and the host device is set forth in U.S. Pat. No. 6,283,375 and in U.S. patent application Ser. No. 09/960,247, entitled "Bar Code Symbol Reading Device Having Intelligent Data Communication Interface To A Host System", filed on Sep. 27,2001, commonly assigned to Assignee of the Present Invention and herein incorporated by reference in its entirety.

In the illustrative embodiment, power control circuitry 641 is connected in series between the rechargeable battery (not shown) of the device 151' and a power distribution circuit that provides electrical power to the electrical components of the device 151'. The function of the power control circuitry 641 is to automatically control (i.e. manage) the availability of battery power to electrically-active components within the bar code symbol reading device 151' under a predefined set of operating conditions. The power control circuitry 641 includes a resettable timer that controls the availability of battery power (if the rechargeable battery is charged) to electrically-active components within the bar code symbol reading device 151'. More specifically, upon reset, the timer specifies a predetermined time interval over which battery power is provided to electrically-active components within the bar code symbol reading device 151'. After expiration of the predetermined time interval (if the timer has not been reset), battery power is unavailable to (i.e., electrically isolated from) the electrically-active components within the bar code symbol reading device 151'. There are three different power switching events which reset the timer to thereby maintain the availability of battery power (if the rechargeable battery is charged) to the electrically-active components within the bar code symbol reading device 151'. The first power switching event comprises actuation of manually-actuatable power-reset switch (not shown), which may be spring-biased push-type button/switch (or mechanical/electromechanical/electronic sensor) mounted on the exterior of the scanner housing. The second power switching event comprises placing the handle portion of the scanner housing within the recess of the scanner support stand hereof, whereby mode-select sensor 639 (e.g., Hall-effect sensor) disposed within the handle of the housing detects magnetic flux produced from permanent magnet 640 mounted within the scanner support stand recess, as shown in FIG. 5B. The third power switching event comprises successfully reading a bar code symbol wherein the bar code symbol reading module 621 produces control activation signal $A_3=1$. A more detailed description of such power control circuitry is set forth in U.S. Pat. No. 5,844,227 to Schmidt et al. incorporated by reference above in its entirety. In this illustrative embodiment, in the automatic hand-held mode of operation, the bar code symbol reading device will automatically transition into power conserving operation (wherein battery power (if the rechargeable battery is charged) is not available to the electrically-active components within the bar code symbol reading device 151') upon the expiration of the resettable timer. To return to normal power-on operations (wherein battery power (if the rechargeable battery is charged) is made available to the electrically-active components within the bar code symbol reading device 151'), the user is required to activate the power-reset switch. Advantageously, such operations provide for automatic conservation of the battery power stored in the rechargeable battery, thereby extending the operational lifetime of the bar code symbol reading device in the handheld mode of operation.

The primary purpose of the SOS photoreceiving circuit 631 is to detect laser light directed thereto by positioning indicating optical element(s) of the scanning platform (such as a lens and light guide or mirror as described above) and to derive a timing signal $T_{SOS}$ that is synchronized thereto. As the rotating polygon rotates, the scanning beam is directed across each stationary mirror from the mirror's leading edge to the mirror's trailing edge. For example, the clockwise rotation of the rotating mirror 36 in FIG. 4D2 causes the scanning beam to be directed across the central stationary mirror 38C from its leading edge 61 to its trailing edge 63. In the illustrative embodiments described above with respect to FIGS. 4C and 4D1 and 4D2, the positioning indicating optical element(s) of the scanning platform (such as a lens and light guide or mirror) is preferably positioned at (or near) the trailing edge of the particular mirror group (e.g., the trailing edge 63 of central stationary mirror 38C as shown in FIG. 4D2) that provides the uni-directional single scan line as the rotating polygon rotates and redirects the scanning beam thereto. The SOS photoreceiving circuit 631 generally comprises one or more photodetector(s) (e.g. a silicon photosensor) for detecting the laser light focused thereon and producing an analog electrical signal which is proportional to the intensity of the detected laser light. This analog signal is supplied to circuitry that generates a timing signal $T_{SOS}$ having pulses (e.g., a pulse train), each corresponding to a single rotation of the rotating polygon, that are synchronized to the incidence of the scanning beam on (or near) the trailing edge of the particular mirror group (e.g., the trailing edge 63 of central stationary mirror 38C) that provides the unidirectional single scan line (as the rotating polygon rotates and redirects the scanning beam thereto). An example of the timing signal $T_{SOS}$ produced by the SOS photoreceiving circuit 631 is shown in FIG. 7A including pulses (e.g., a pulse train), each corresponding to a single rotation of the rotating polygon, that are synchronized to the time $T_1$ when the scanning beam is incident on (or near) the trailing edge of the particular mirror group (e.g., the trailing edge 63 of the central stationary mirror 38C) that provides the unidirectional single scan line.

In an alternate embodiment, the rotating mirror 36 may be rotated in a counterclockwise sense (not shown), which causes the scanning beam to be directed across the central stationary mirror 38C from edge 63 to edge 61. In this illustrative embodiment, the positioning indicating optical element(s) of the scanning platform (such as a lens and light guide or mirror) is preferably positioned at (or near) the edge 61 of central stationary mirror 38C, which provides the uni-directional single scan line as the rotating polygon rotates and redirects the scanning beam thereto.

The primary purpose of the timing signal generator circuit 633 is to derive a timing signal $T_{SLS}$ from the timing signal $T_{SOS}$, wherein the timing signal $T_{SLS}$ is synchronized to the time interval when the scanning beam (as redirected by the rotating polygon) strikes the particular mirror group (e.g., central stationary mirror 38C) that provides the uni-directional single scan line as the rotating polygon rotates and redirects the scanning beam thereto. Preferably, the timing signal $T_{SLS}$ provides pulses (e.g., a pulse train), each corresponding to a single rotation of the rotating polygon and each having a leading and trailing edge synchronized to the time interval when the scanning beam (as redirected by the rotating polygon) strikes the particular mirror group (e.g., central stationary mirror 38C) that provides the uni-directional single scan line (as the rotating polygon rotates and redirects the scanning beam thereto). An example of the timing signal $T_{SLS}$ produced by the timing signal generator circuit 633 is shown in FIG. 7B.

The VLD duty cycle control circuit 635 operates, under control of the control circuitry 611A in the uni-directional (single scan line) scan mode of operation, to control the duty cycle of the VLD of the laser beam production module such that the laser beam is produced therefrom only during those time intervals when the laser beam (as redirected by the rotating polygon 36) provides the uni-directional single line scan (e.g., strikes the central stationary mirror 38C) as specified by the pulses of the timing signal $T_{SLS}$. However, the VLD duty cycle control circuit 635 operates, under control of the control circuitry 611A in the omni-directional (multiple scan line) scan mode of operation, to control the duty cycle of the VLD of the laser beam production module such that the laser beam is produced continuously therefrom to thereby produce the omni-directional multiple line scan as discussed above. An example of Boolean logic expressions that selectively enable the VLD drive circuitry of the scanning circuit 613 to provide such VLD duty cycle control is illustrated in FIG. 7C. The first term provides the enablement of the VLD drive circuitry in the unidirectional (single scan line) scan mode of operation (which is dictated by the control circuitry 611A with signals $E_{10}=1$ and $A_5=1$). The second term provides the enablement of the VLD drive circuitry in the omni-directional (multiple scan line) scan mode of operation (which is dictated by the control circuitry 611A with signals $E_{10}=1$ and $A_5=0$).

In the illustrative embodiment, the system control operations performed by the control circuitry 611A and the control module 611B selectively enable either: i) the scanning circuit 613, scan photoreceiving circuit 615, SOS photoreceiving circuit 631, timing signal generator circuit 633 and VLD duty cycle control circuit 635 using enable signal $E_{10}=1$, or ii) object detect circuitry 629 (and object sensing circuitry 627 indirectly) using enable signal $E_1=1$; while providing only biasing voltages to all other system components. Advantageously, this control strategy ensures that the scanning circuit 613, scan photoreceiving circuit 615, SOS photoreceiving circuit 631 and the object sensing circuit 627 are not active at the same time. Generally, it would be disadvantageous to do so because the wavelength of the infrared LED of the object sensing circuit 627 typically falls within the optical input spectrum of the scan photoreceiving circuit 615 and SOS photoreceiving circuit 631. In addition, less power is consumed when either set of components is inactive (i.e. disabled).

Figure 7D:
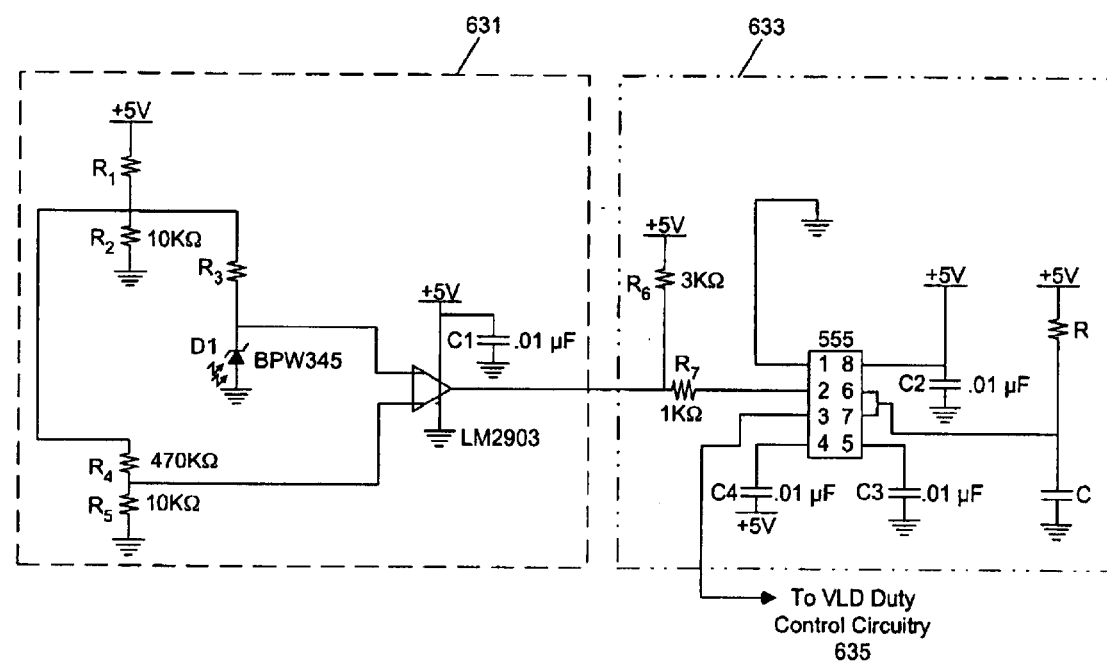
FIG. 7D is a schematic diagram of an illustrative embodiment of the SOS Photoreceiving Circuit and Timing Signal Generator Circuit used in the system shown in FIGS. 6A and 6B.

An illustrative embodiment of the SOS photoreceiving circuit 631 and timing signal generator 633 is shown in FIG. 7D. The SOS photoreceiving 631 includes a photodetector D1 and associated bias circuitry that detects the laser light directed thereto by the positioning indicating optical element (s) of the scanning platform (such as a lens and light guide or mirror as described above) and produces an analog electrical signal which is proportional to the intensity of the detected laser light. This analog signal is supplied to a comparator (LM2903), which switches logic states from a high level to a low level and then back in response to large signal variations (pulses) in the electrical signal produced by the photodetector to thereby generate the timing signal $T_{SOS}$ as shown in FIG. 7A. The timing signal generator 633 includes a 555 timer circuit configured for mono-stable (one-shot) operation as is well known in the art, which includes the following pin descriptions:

Pin 1—Ground
Pin 2—Trigger
Pin 3—Output
Pin 4—Reset
Pin 5—Control Voltage
Pin 6—Threshold
Pin 7—Discharge
Pin 8—V+

In this configuration, the timing signal $T_{SOS}$ is supplied to the trigger input (pin 2) of the 555 timer, which provides a delay pulse at its output (pin 3) that is coincident to the input pulse supplied via the trigger input and whose duration is controlled by the values of external resistor R and capacitor C (e.g., delay interval=1.1 *R*C). Thus, such R,C values are selected to correspond to the time duration (e.g. the time period between $T_2$ and $T_1$ in FIG. 7B) that the scanning beam (as redirected by the rotating polygon) strikes the other mirrors (and does not strike the particular mirror group, e.g., central stationary mirror 38C, that provides the unidirectional single scan line). When configured in this manner, the 555 timer generates the timing signal $T_{SLS}$ as shown in FIG. 7B.

As described above, the timing signal $T_{SLS}$ is provided to VLD duty cycle control circuit 635, which operates, under control of the control circuitry 611A in the uni-directional (single scan line) scan mode of operation, to control the duty cycle of the VLD of the laser beam production module such that the laser beam is produced therefrom only during those time intervals when the laser beam (as redirected by the rotating polygon 36) provides the uni-directional single line scan (e.g., strikes the central stationary mirror 38C) as specified by the pulses of the timing signal $T_{SLS}$. The VLD duty cycle control circuit 635 operates, under control of the control circuitry 611A in the omni-directional (multiple scan line) scan mode of operation, to control the duty cycle of the VLD of the laser beam production module such that the laser beam is produced continuously therefrom to thereby produce the omni-directional multiple line scan as discussed above. An example of Boolean logic expressions that selectively enable the VLD drive circuitry of the scanning circuit 613 to provide such VLD duty cycle control is illustrated in FIG. 7C. The first term provides the enablement of the VLD drive circuitry in the uni-directional (single scan line) scan mode of operation (which is dictated by the control circuitry 611A with signals $E_{10}=1$ and $A_5=1$). The second term provides the enablement of the VLD drive circuitry in the omni-directional (multiple scan line) scan mode of operation (which is dictated by the control circuitry 611A with signals $E_{10}=1$ and $A_5=0$).

In an alternate embodiment of the present invention, the timing signal(s) synchronized to the time interval when the laser beam (as redirected by the rotating polygon 36) provides the uni-directional single line scan (e.g., strikes the central stationary mirror 38C), such as timing signal $T_{SLS}$ as set forth above, may be used to control the power level of the laser light source of the laser beam production module in the single line scan mode of operation such that:

i) the output power of the laser beam produced therefrom is set to the normal output power when the laser beam (as redirected by the rotating polygon 36) strikes the mirror(s) that provide the uni-directional signal line scan (e.g., the central stationary mirror 38C); and ii) the output power of the laser beam produced therefrom is significantly less than normal output power (for example, ⅕₀th of the output power of the laser beam during normal operation) when the laser beam (as redirected by the rotating polygon 36) strikes the mirrors that are not used to provide the uni-directional signal line scan (e.g., the mirrors other than the central stationary mirror 38C).

Figure 7E:
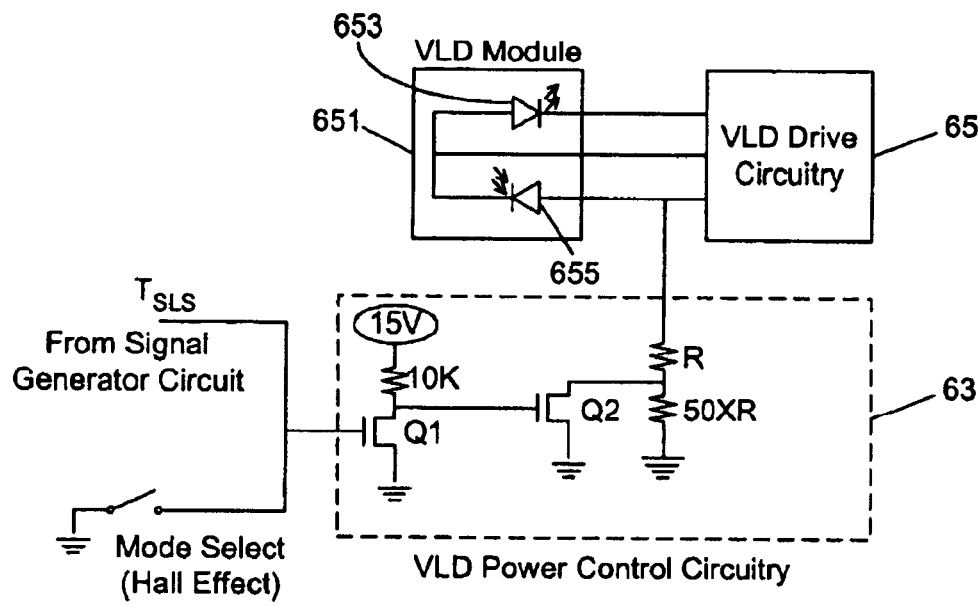
FIG. 7E is a schematic diagram of an illustrative embodiment of VLD Duty Cycle Control Circuit used in the system of FIGS. 6A and 6B, to generate timing signals and control the power level of a laser light source during tern operation.

FIG. 7E is a schematic diagram of an illustrative embodiment of circuitry 635' that utilizes such timing signals to control the power level of a laser light source (e.g., VLD). In this illustrative embodiment, the scanning platform includes a VLD module 651 with a laser diode 653 and integral monitor photodiode 655. As is well known in the art, VLD Drive Circuitry 657 utilizes the current produced by the monitor photodiode 655 as feedback to control the power of the laser diode 653 (i.e., the amount of current supplied to the laser diode 653) such that the laser diode operates in a suitable operating range. The current produced by the monitor photodiode 655 and the corresponding optical power produced by the laser diode 653 is set by the value of bias resistance operably coupled to VLD Drive circuitry 657. More specifically, the optical power produced by the laser diode 653 is inversely proportional to the value of such bias resistance. A bias resistance value, which is denoted $R_{SBT}$ for the sake of description, that produces a laser beam with normal output power characteristics is selected by testing of the system.

Circuitry 635' operates during the single scan line mode of operation (e.g., when the scanning device is removed from its supporting base unit and the mode select switch is open) to vary the effective bias resistance provided to the VLD Drive circuitry 657 in response to logic level variations of the timing signal supplied thereto (e.g., timing signal $T_{SLS}$) to control the output power level of the laser diode 653 as follows:

i) when the laser beam (as redirected by the rotating polygon 36) strikes the mirror(s) that provide the unidirectional signal line scan (e.g., the central stationary mirror 38C), the effective bias resistance provided to the VLD Drive circuitry 657 is approximately $R_{SBT}$, which sets the output power of the laser beam produced by the laser diode 653 to the normal output power; and ii) when the laser beam (as redirected by the rotating polygon 36) strikes the mirror(s) that are not used to provide the unidirectional signal line scan (e.g., the mirrors other than the central stationary mirror 38C), the effective bias resistance provided to the VLD Drive circuitry 657 is approximately 50* $R_{SBT}$, which sets the output power of the laser beam produced by the laser diode 653 to be significantly less than the output power during normal operation (in this example, ⅕₀th of the output power of the laser beam during normal operation); such operation produces multiple low power "dim" laser scanning lines that scan the scanning field.

Circuitry 635' operates during the omni-directional scan mode of operation (e.g., when the scanner housing is placed in its supporting base unit and the mode select switch is closed) to provide a bias resistance to the VLD Drive circuitry 657 (that does not vary in response to logic level variations of the timing signal supplied thereto (e.g., timing signal $T_{SLS}$) that is approximately $R_{SBT}$, which sets the output power of the laser beam produced by the laser diode 653 to normal output power during the full rotation of the scanning element. Such operation produces multiple normal power laser scanning lines that scan the scanning field.

As shown in FIG. 7E, circuit 635' includes a FET transistor Q1 (configured as an inverter) whose input is operably coupled to the timing signal $T_{SLS}$ (generated by the timing signal generator) and the mode select switch. The output of Q1 is coupled to gate of second FET transistor Q2. The output of Q2 is coupled to the intermediary node between two resistors coupled in series between the VLD Drive circuitry 657 and signal ground. One of these resistors has a resistance $R_{SBT}$ and the other resistor has a resistance 50*$R_{SBT}$ as shown. The ON/OFF operation of Q2 controls the effective bias resistance supplied to the VLD drive circuitry, and thus the optical power of the laser diode 653.

As shown in the table of FIG. 7E, when Q1 is OFF, Q2 is ON and the effective bias resistance provided to the VLD Drive circuitry is approximately $R_{SBT}$. This sets the output power of the laser beam produced by the laser diode 653 to the normal output power. Yet, when Q1 is ON, Q2 is OFF and the effective bias resistance provided to the VLD Drive circuitry is approximately 51$R_{SBT}$ ($R_{SBT}$+50*$R_{SBT}$). This sets the output power of the laser beam produced by the laser diode 653 to be significantly less than the output power during normal operation (in this example, ⅕₀th of the output power of the laser beam during normal operation).

In addition, the table of FIG. 7E shows the interaction of the mode select switch and the logic levels of the timing signal $T_{SLS}$ in conjunction with the ON/OFF state of FET transistors Q1 and Q2 in controlling the effective bias resistance supplied to the VLD Drive circuitry 657 during the single line scan mode of operation (e.g., when the scanner housing is removed from its supporting base unit and the mode select switch is open) and during the omni-directional scan mode of operation (e.g., when the scanner housing is placed in its supporting base unit and the mode select switch is closed).

Figure 8:
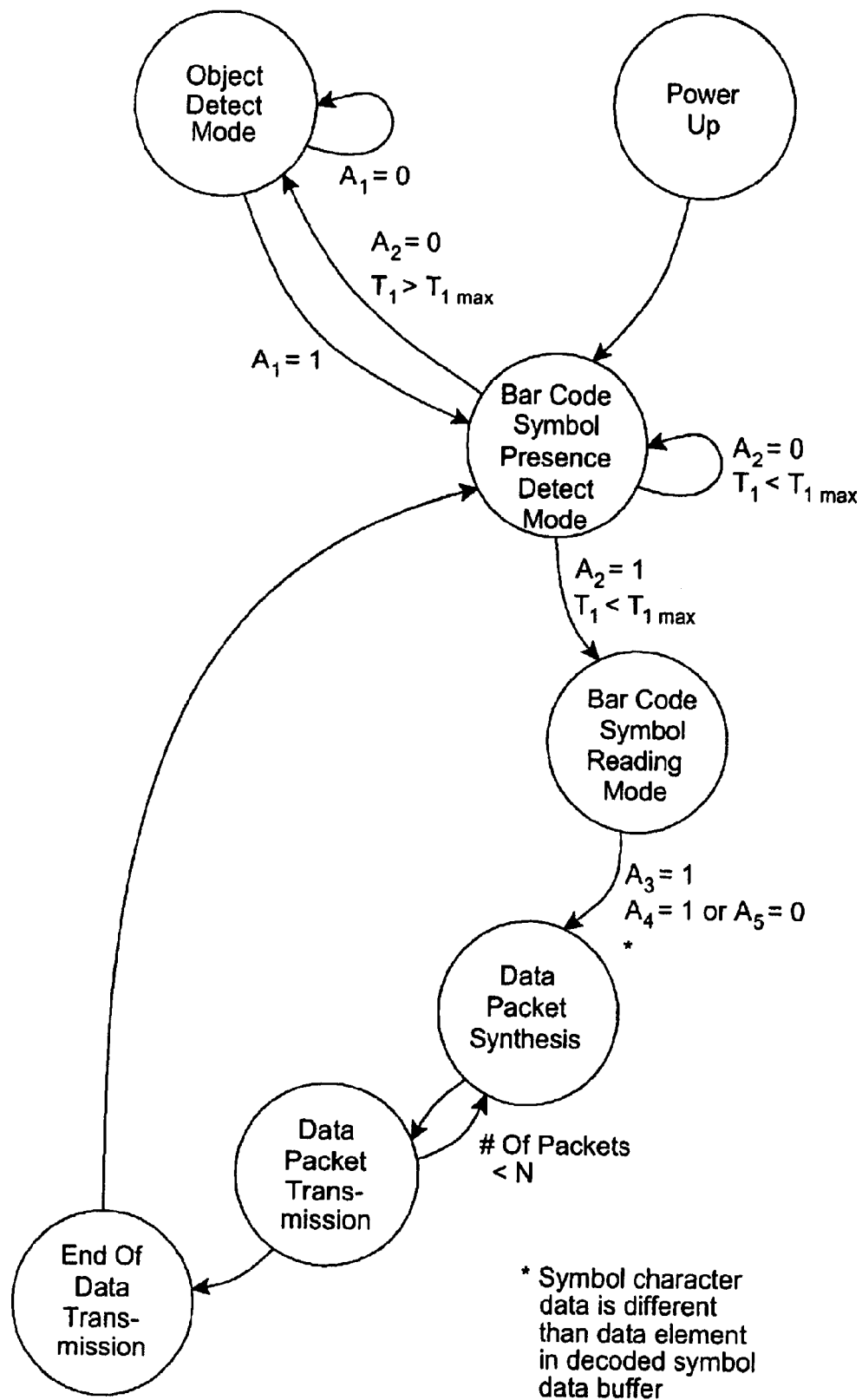
FIG. 8 is a state diagram illustrating the various states that the automatically-activated bar code reading device of the present invention may undergo during the course of its programmed operation.

Referring to FIG. 8, the automatically-activated hand-supportable bar code reading device of the present invention has four basic states of operation namely: object detection, bar code symbol presence detection, bar code symbol reading, and symbol character data transmission (which is shown as 3 states: Data Packet Synthesis, Data Packet Transmission and End of Data Transmission). The nature of each of these states is described above in great detail.

Transitions between the various states are indicated by directional arrows. Besides each set of directional arrows are transition conditions expressed in terms of control activation signals (e.g. $A_1$, $A_2$, $A_3$, $A_5$) and where appropriate, state time intervals (e.g. $T_1$). In the illustrative embodiment depicted by the state diagram of FIG. 8, the automatically-activated hand-supportable bar code reading device is powered-up and automatically enters the bar code symbol presence detect state. Upon detecting a bar code symbol and successfully reading the bar code symbol in the bar code reading state, the device automatically enters the data transmission state (upon occurrence of the prescribed conditions) to transmit the symbol character data corresponding thereto to the host system. Upon completion of such data transmission, the device returns to the bar code symbol presence detect state to attempt to detect/read/transmit additional bar code symbols in its scanning field. Conveniently, the state diagram of FIG. 8 expresses most simply the four basic operations occurring during the control flow within the system control program of FIGS. 9A to 9D. Significantly, the control activation signals $A_1$, $A_2$, $A_3$, $A_4$ and $A_5$ in FIGS. 8 indicate which events within the object detection and/or bar code detection/reading states can operate to effect a state transition within the allotted time frame(s), where prescribed.

FIGS. 9A, 9B, 9C and 9D, taken together, show a high level flow chart of an exemplary control process carried out by the control subsystem of the bar code reading device 151' of FIG. 6 during the course of its programmed operation. Notably, in system control process shown in FIGS. 9A to 9D, it has been assumed that the system employs a one-way RF data communication link between the bar code symbol reading device and its associated base unit, as shown in FIGS. 6A and 6B. It is understood that alternative data communication links, based on 1-way and 2-way RF principles alike, can be used with excellent results.

Figure 9A:
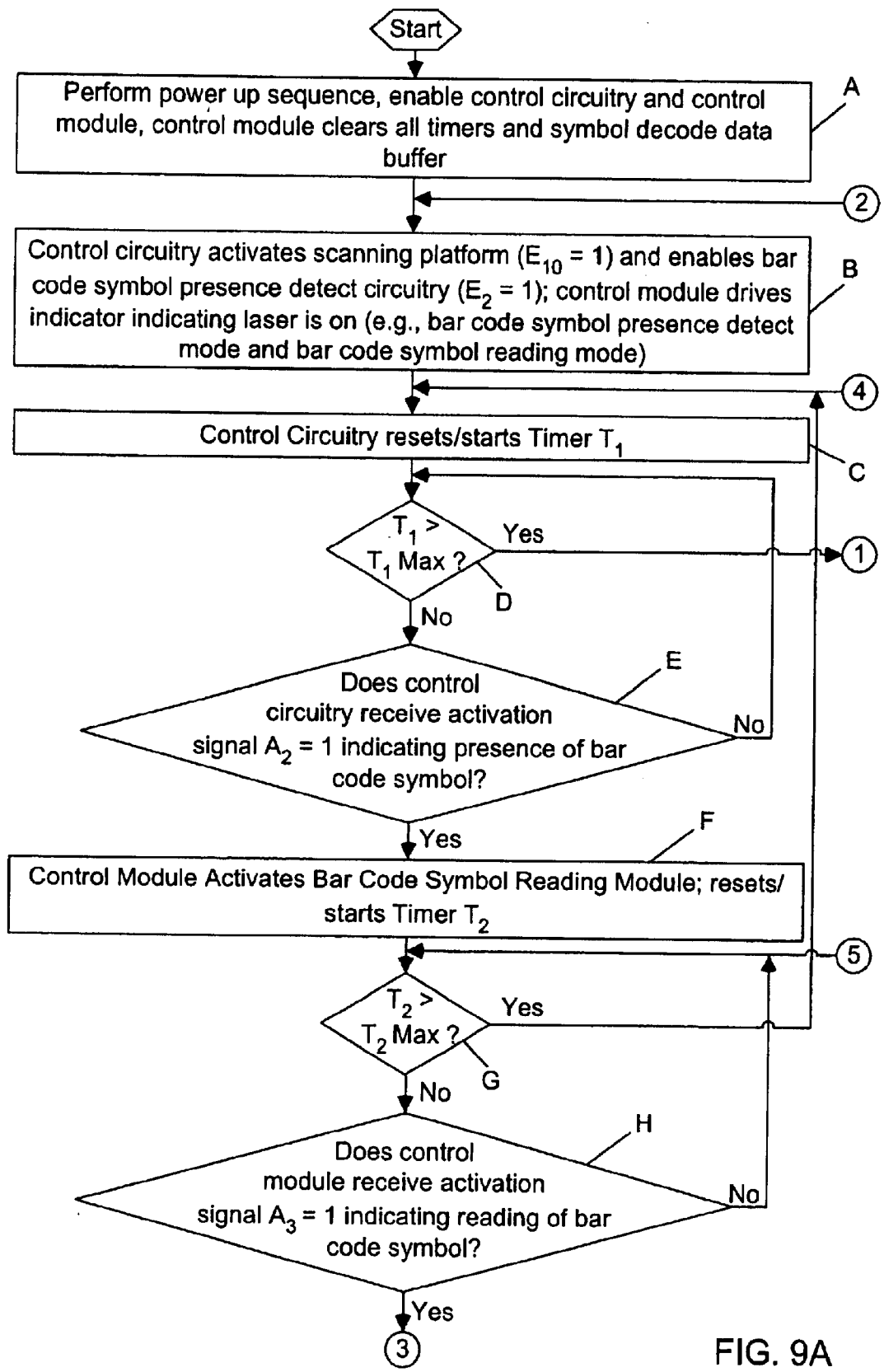
FIGS. 9A, 9B, 9C and 9D, taken together, show a high level flow chart of an exemplary control process carried out by the control subsystem of the bar code reading device of FIGS. 6A and 6B during the course of its programmed operation.

Beginning at block A of FIG. 9A, the bar code symbol reading device is "initialized". This initialization step involves several steps, including: activating (i.e. enabling) control circuitry 611A and control module 611B, clearing all timers ($T_1$, $T_2$, $T_3$), and clearing the symbol decode data buffer.

In block B, control circuitry 611A activates the scanning platform (e.g., scan photoreceiving circuit 615, A/D conversion circuitry 317, SOS photoreceiving circuit 631, timing signal generator circuit 633, VLD duty cycle control circuit 635 and scanning circuit 613) by producing $E_{10}$=1. In addition, the control circuitry 611A enables bar code symbol presence detect circuitry 619 by producing $E_2$=1. Control module 611B drives a visible indicator (one or more of lights 170') that indicates the laser is ON (which remains ON during bar code symbol presence detect operations and bar code symbol reading operations).

In Block C, control circuitry 611A resets and starts Timer $T_1$, permitting it to run for a predetermined time period $T_1$ max (which may be, for example, 10 seconds).

In block D, the control circuitry 611A checks to determine whether the Timer $T_1$ has expired (i.e., $T_1 > T_1$ max). If not, the operation returns to block E. If so, the operation continues to block X as shown in FIG. 9D to perform object detection.

In Block E, the control circuitry 611A checks to determine whether it has received control activation signal $A_2=1$ from the bar code symbol presence detect circuitry 619 (indicating the presence of a bar code symbol in the scanning field). The operations of blocks D and E thus determine whether control circuitry 611A has received control activation signal $A_2=1$ within the time period $T_1$ max. If this signal is received within the prescribed time period, the operation continues to block F; otherwise the operation returns to block D.

In block F, the control module 611B activates the bar code symbol reading module 621 (for example, by producing $E_3=1$) and resets and starts Timer $T_2$, permitting it to run for a predetermined time period $T_2$ max (which may be, for example, 3 seconds).

In block G, the control module 611B checks to determine whether the Timer $T_2$ has expired (i.e., $T_2 > T_2$ max). If not, the operation continues to block H. If so, the operation returns to block C to perform bar code symbol presence detection operations.

In Block H, the control module 611B checks to determine whether it has received control activation signal $A_3=1$ from the bar code symbol reading module 621 (indicating the successful reading of a bar code symbol in the scanning field). The operations of blocks G and H thus determine whether control module 611B has received control activation signal $A_3=1$ within the time period $T_2$ max. If this signal is received within the prescribed time period, the operation continues to block I of FIG. 9B; otherwise the operation returns to block G.

Figure 9B:
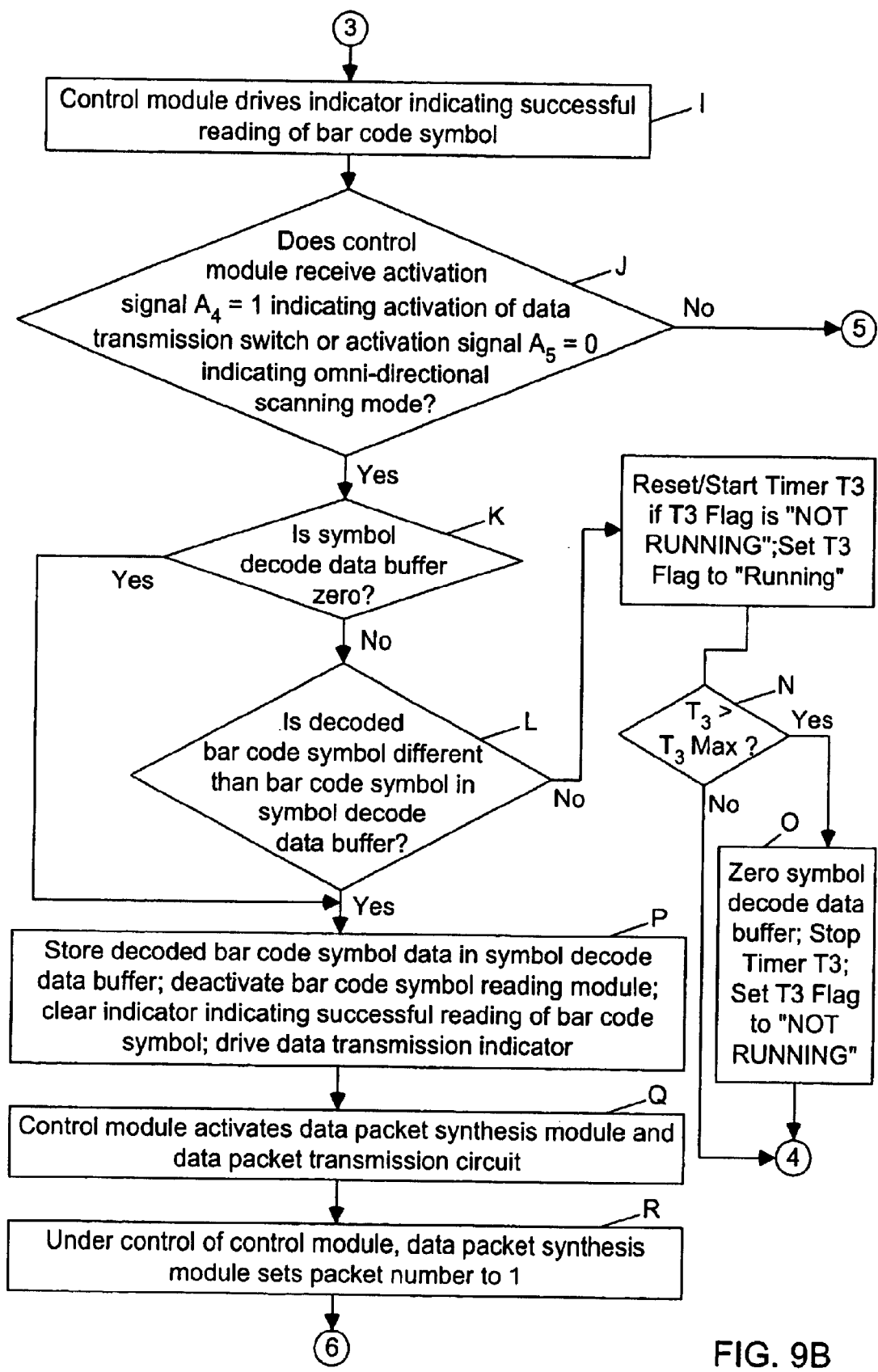

Referring to FIG. 9B, in block I, the control module 611B drives a visible indicator (one or more of the lights 170') that indicates successful reading of a bar code symbol and operation continues to block J.

In block J, the control module 611B checks whether it has received either control activation signal $A_4=1$ from the data transmission switch 637 (indicating the activation of the data transmission switch), or control activation signal $A_5=0$ from the mode select switch 639 (indicating omni-directional scan mode). The operations of blocks G,H, and J thus determine whether the control activation signal $A_3=1$ and (activation signal $A_4=1$ or control activation signal $A_5=0$) have been received within the time period $T_2$ max. If this condition is met, the operation continues to block K; otherwise the operation returns to block G to continue bar code symbol reading operations.

In block K, the control module 611B checks whether the symbol decode buffer is zeroed. If so, the operation continues to block P; otherwise the operation continues to block L.

In Block L, the control module 611B checks whether the bar code symbol decoded by the bar code symbol reading module 621 is different than the bar code symbol in the symbol decode buffer. If so, the operation continues to block P; otherwise the operation continues to block M.

In Block M, the control module 611B resets and starts Timer $T_3$ if a status flag (T3 Flag) indicates that Timer $T_3$ is "NOT RUNNING" and sets this status flag to "RUNNING". In block N, the control module 611B checks to determine whether the Timer $T_3$ has expired (i.e., $T_3 > T_3$ max). If not, the operation returns to block C to perform bar code symbol presence detect operations. If so, the operation continues to block O wherein the symbol decode data buffer is zeroed, the timer $T_3$ is stopped, and the status flag is set to "NOT RUNNING", and the operation returns to block C. The operations of blocks L,M, N and O is designed to identify the situation where the same bar code is read by the system over successive reading periods, and disable the transmission of the subsequently read bar code symbols until a waiting period (bounded by timer $T_3$) has expired)

In block P, the control module 611B stores the bar code symbol data generated by the bar code symbol reading module 621 in the symbol decode data buffer, deactivates the bar code symbol reading module 621, clears the indicating successful reading of a bar code symbol, and drives a visual indicator (e.g., one or more of lights 170') indicating data transmission.

In block Q, the control module 611B activates the data packet synthesis module 623 and data packet transmission circuit 625 and operates in blocks R though W to transmit a predetermined number of N packets that contain such bar code symbol data stored in the symbol decode data buffer to the base unit 503, which communicates such information to the host system operably coupled thereto.

In block R, the data packet synthesis module 623 operates, under control of control module 611B, to set a packet number to 1.

Figure 9C:
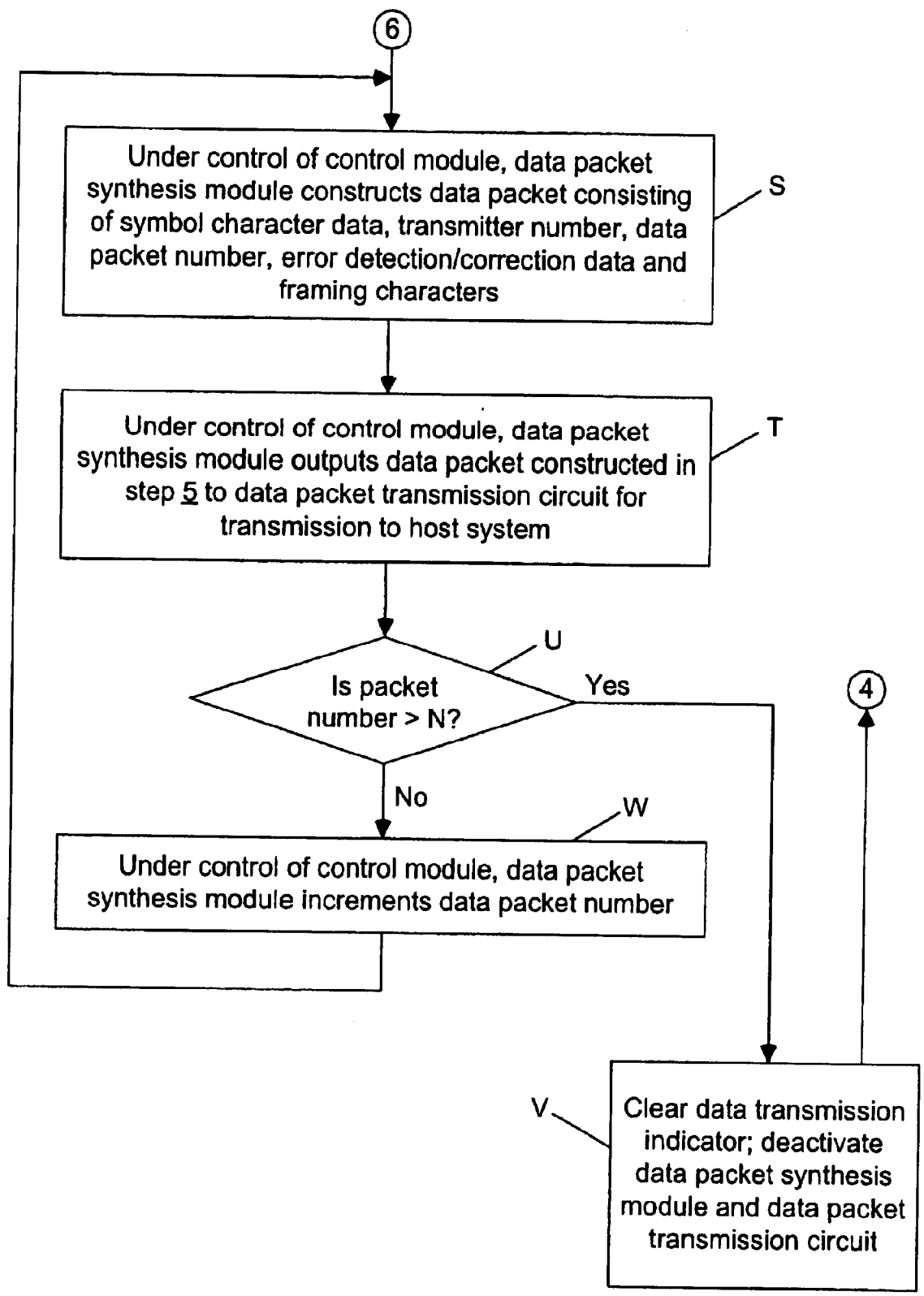

Referring to FIG. 9C, in block S, the data packet synthesis module 623 operates, under control of control module 611B, to construct a data packet that contains the symbol character data as wells as a transmitter number, data packet number, error detection and correction data and framing characters.

In block T, the data packet synthesis module 623 outputs the data packet constructed in block S to the data transmission circuit 625, for transmission to the base unit 503, which communicates such information to the host system. Thereafter, the data packet transmission circuit 625 transmits this data packet to the base unit 503, which communicates such information to the host system.

In block U, the data packet synthesis module 623 checks whether it has constructed and output the N packets that represent the symbol character data stored in the symbol decode data buffer. If so, the operation continues to block V wherein the control module 611B clears the data transmission indicator and deactivates the data packet synthesis module 623 and the data transmission circuit 625.

If in block U, the data packet synthesis module 623 determines the it has not completed constructed and output of the N packets, it increments the data packet number and returns to block S to continue construction and output of the next data packet.

Figure 9D:
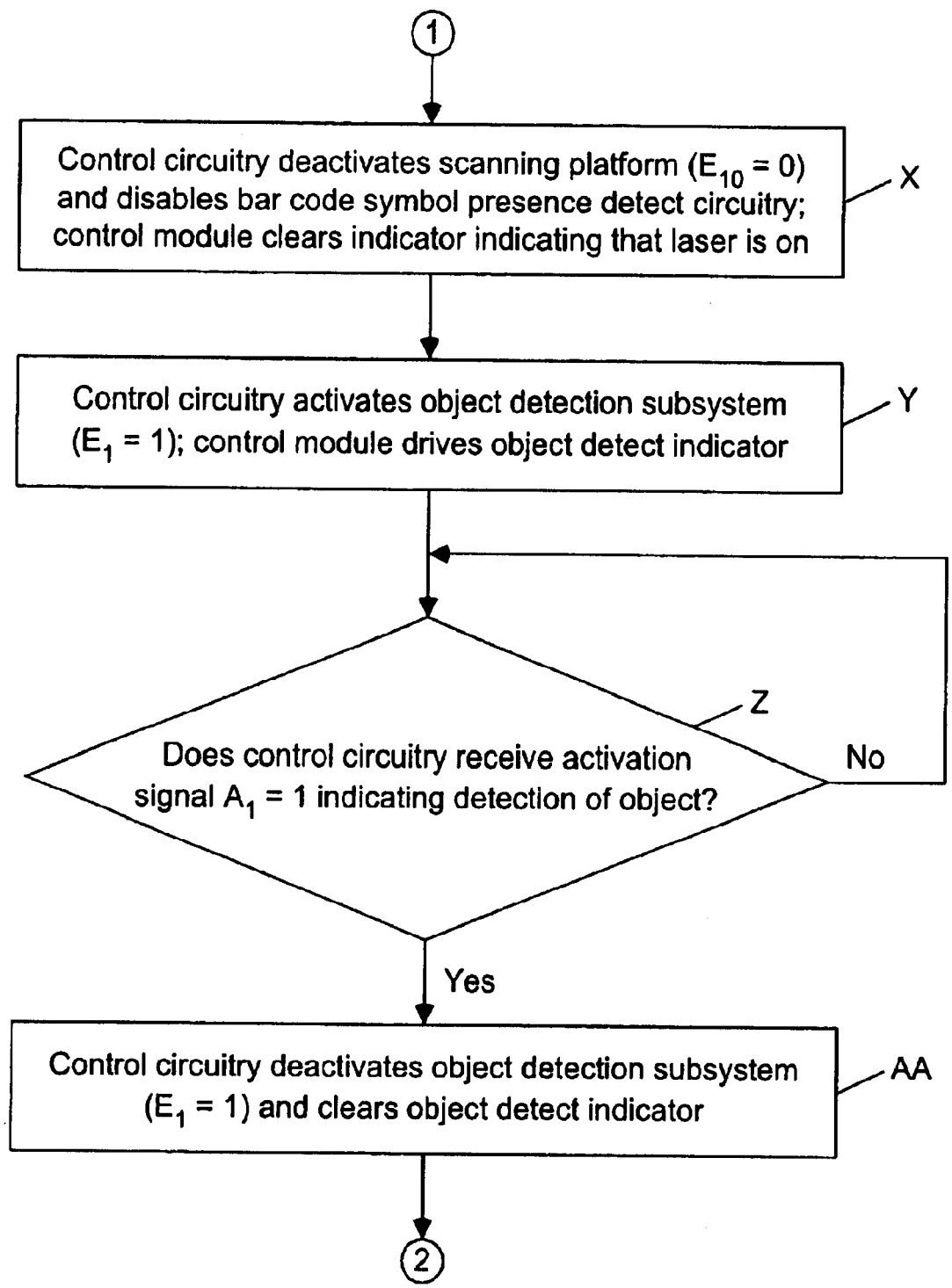

Referring to FIG. 9D, the control operations of the object detect state are described in blocks X through AA. In block X, the control circuitry 611A deactivates the scanning platform (e.g., scan photoreceiving circuit 615, A/D conversion circuitry 317, SOS photoreceiving circuit 631, timing signal generator circuit 633, VLD duty cycle control circuit 635 and scanning circuit 613) by producing $E_{10}=0$. In addition, the control circuitry 611A disables bar code symbol presence detect circuitry 619 by producing $E_2=0$, and control module 611B clears the visible indicator that indicates the laser is ON.

In block Y, the control circuitry 611A activates the object detection subsystem (circuitry 627 and 629) by producing $E_1=1$, and control module 611B drives the visible indicator (e.g., one of the lights 170') that indicates the device is performing object detection operations.

In block Z, the control circuitry 611A checks to determine whether it has received control activation signal $A_1=1$ from the object detect circuitry 629 (indicating the presence of an object in the object detect field). If this signal is received, the operation continues to block AA; otherwise the operation returns to block Z to continue the object detection operations.

In block AA, the control circuitry deactivates the object detection subsystem (circuitry 627 and 629) by producing $E_1=0$, and control module 611B clears the visible indicator that indicates the device is performing object detection operations, and operation continues to block B as shown in FIG. 9A to perform bar code symbol detection and bar code symbol reading operations.

It should be noted that the object detection subsystem, the object detect state, and the corresponding object detection operations performed in the object detect state as described above may be omitted. In such a system, instead of entering the object detect mode, the device is controlled to enter a sleep mode wherein much of the active components of the device are turned off (for power savings). In this sleep mode, the device automatically transitions into the bar code symbol presence detect state after a predetermined sleep period.

In addition, it should be noted that the control process carried out by the control subsystem of the bar code reading device 151' of FIGS. 6A and 6B during the course of its programmed operation as set forth above may be varied significantly without departing from the scope of the inventions as described earlier herein.

Examples of such variations in control are described in detail in U.S. Pat. No. 6,283,375 to Wilz et al., incorporated by reference above in its entirety. In another exemplary variation, the control subsystem can be programmed to enable a user to selectively operate the hand-holdable bar code scanning device in the unidirectional single line scan mode while the scanning device rests in its support stand. Such user control may be provided via user interaction with the data transmission activation switch 637. For example, the control subsystem can be programmed to monitor the status of control activation signals $A_4$ and $A_5$ produced by the data transmission switch and mode select switch, respectively. In the event that the control subsystem detects the presence of control activation signal $A_5=0$ (indicating the hand-holdable bar code scanning device rests in its support stand) in addition to control activation signal $A_4=1$ (indicating the activation of the data transmission switch), the control subsystem can switch into the uni-directional single line bar code scanning/reading mode (and enable the operations performed therein) as described above when the data transmission switch is deactivated (e.g., transition to control activation signal $A_4=0$). Such single line bar code scanning operations preferably involve controlling the duty cycle (or power level) of the laser light source to enable uni-directional single line bar code scanning as described above.

Additional Features

In the illustrative embodiments described above, the spectral transmission characteristics of the light transmission window 168 of the bar code symbol reading device are preferably tuned to the characteristic wavelength range of the light source(s) used for scanning and object detection such that wavelengths close to this characteristic wavelength range are permitted to exit and enter the interior volume of the housing with minimum attenuation, while wavelengths substantially less than this characteristic wavelength range (and/or wavelengths substantially greater than this characteristic wavelength range) are not permitted to exit and enter the interior volume of the housing (i.e., provides substantial attenuation of such wavelengths). For example, consider the case where the light source used for scanning is a VLD with a characteristic wavelength range centered around 670 nanometers and where the light source used for object detection is an infra-red LED with a characteristic wavelength centered around 870 nanometers, the spectral transmission characteristics of the light transmission window may be tuned such that all wavelengths greater (i.e. longer) than slightly less than 670 nm (e.g. longer than 665 nm) are permitted to exit and enter the interior volume of the housing with minimum attenuation. As a result of such characteristics, the scans lines (at 670 nanometers) and the infra-red (IR) light (at about 870 nm) are allowed to propagate through the transmission window 168, reflect from an object/bar code surface, and return through the transmission window, while minimizing the propagation of spectral noise from light sources outside this band (e.g., having wavelengths less than 665 nm) through the window, thereby improving the signal-to-noise ratio of the scanning engine.

Similarly, an optical filter having transmission characteristics tuned to the characteristic wavelength range of the light source used for scanning may be mounted in front of the detector of the scanning engine (e.g., the detector 41 of the scanning platform of FIGS. 4A to 4D2) such that wavelengths close to this characteristic wavelength range are permitted to exit and enter the interior volume of the housing with minimum attenuation, while wavelengths substantially less than this characteristic wavelength range(and/ or wavelengths substantially greater than this characteristic wavelength range) are not permitted to exit and enter the interior volume of the housing (i.e., provides substantial attenuation of such wavelengths). This minimizes the spectral noise from light sources outside this band (e.g., having wavelengths less than 665 nm) that are incident on the detector, thereby improving the signal-to-noise ratio of the scanning engine.

The details of such optical filtering arrangements are disclosed in U.S. Pat. No. 5,627,359 to Amundsen et al., commonly assigned to assignee of the present application, herein incorporated by reference in its entirety.

It is understood that the automatically-activated hand-holdable bar code reading systems and methods of the illustrative embodiments described hereinabove may be modified in a variety of ways which will become readily apparent to those skilled in the art of having the benefit of the novel teachings disclosed herein. All such modifications and variations of the illustrative embodiments thereof shall be deemed to be within the scope and spirit of the present invention as defined by the claims to Invention appended hereto.

What is claimed is:

1. A bar code symbol reading device comprising:
    (1) a hand-supportable housing having a light transmission aperture through which light can exit and enter said hand-supportable housing;
    (2) a laser scanning engine, disposed within said hand-supportable housing, that selectively operates in one of first and second scan modes,
        wherein in said first scan mode, the laser scanning engine projects an omni-directional scan pattern through said light transmission aperture, repeatedly detects and decodes bar code symbols on objects passing through said omni-directional scan pattern, and produces a symbol character data string representative of each bar code symbol read by said laser scanning engine during said first scan mode, and wherein in said second scan mode the laser scanning engine projects a single line scan pattern through said light transmission aperture and repeatedly detects and decodes bar code symbols on objects passing through said single line scan pattern, and produces a symbol character data string representative of each bar code symbol read by said laser scanning engine during said second scan mode, (3) a manually-activated data transmission switch integrated with said hand-supportable housing, for producing, when activated, a data transmission activation control signal in response to activation of said manually-activated data transmission switch;

(4) a data transmission subsystem in said band-supportable housing for transmitting, when activated, a selected one of said produced symbol character data strings to a host device operably coupled to said bar code symbol reading device;

(5) a system control subsystem for controlling said data transmission subsystem so that the symbol character data string, produced at substantially the same time when said data transmission control activation signal is generated, is transmitted to said host device, and said system control subsystem deactivating said data transmission subsystem when said data transmission activation control signal is not being produced by said data transmission switch.

2. The bar code symbol reading device of claim 1, further comprising a support stand that supports said hand-supportable housing, and mode selection means integrated with said hand-supportable housing, for selectively operating said laser scanning engine in one of said first and second scan modes in response to placement of said hand-supportable housing in said support stand.

3. The bar code symbol reading device of claim 2, wherein said device, when placed in said support stand, operates in said first scan mode of operation as a stationary hands-free projection scanner, and wherein said device, when removed from said support stand, operates in said second scan mode of operation as a portable hand-held scanner.

4. The bar code symbol reading device of claim 1, wherein said laser scanning engine comprises:

a bar code symbol presence detection means in said hand-supportable housing for processing scan data so as to detect the presence of said bar code symbol on said object and to automatically generate a first control signal in response to the detection of said bar code symbol; and decode processing means in said band-supportable housing for processing scan data so as to decode said bar code symbol on said object and for automatically producing a symbol character data siring representative of each said read bar code symbol, and automatically generating a second control signal indicative of the production of said symbol character data string.

5. The bar code symbol reading device of claim 4, wherein said bar code symbol presence detection means detects said bar code symbol by detecting first and second envelope borders of said bar code symbol.

6. The bar code symbol reading device of claim 4, wherein said laser scanning engine comprises object detection means in said hand-supportable housing, for detecting said object in at least a portion of an object detection field defined relative to said housing and automatically generating a third control signal indicative of the detection of said object in at least a portion of said object detection field.

7. The bar code symbol reading device of claim 6, further comprising control circuitry that selectively activates said bar code symbol presence detection means and said decode processing means in response to occurrence of said third control signal.

8. The bar code symbol reading device of claim 6, wherein said object detection means comprises:

a signal transmitting means for transmitting a signal towards said object in said object detection field, and a signal receiving means for receiving said transmitted signal reflected off said object in at least a portion of said object detection field, and automatically generating said third control signal indicative of the detection of said object in at least a portion of said object detection field.

9. The bar code symbol reading device of claim 8, wherein said signal transmitting means comprises an infra-red light source for transmitting a pulsed infra-red light signal, and wherein said signal receiving means comprises an infra-red light detector disposed in said hand-supportable housing.

10. The bar code symbol reading device of claim 8, wherein said signal transmitting means comprises a laser diode for transmitting a pulsed laser signal; and wherein said signal receiving means comprises a photodetector disposed in said hand-supportable housing.

11. The bar code symbol reading device of claim 1, wherein said laser scanning engine comprises a visible laser light source, a scanning element and at least one stationary mirror that cooperate to project said single line scan pattern through said light transmission aperture in said second scan mode.

12. The bar code symbol reading device of claim 1, wherein said laser scanning engine comprises a visible laser light source, a scanning element and a plurality of stationary mirrors that cooperate to project said omni-directional scan pattern through said light transmission aperture in said first scan mode.

13. The bar code symbol reading device of claim 12, wherein said visible laser light source, scanning element and a predetermined subset of said plurality of stationary mirrors of the laser scanning engine cooperate to project said single line scan pattern through said light transmission aperture in said second scan mode.

14. The bar code symbol reading device of claim 13, further comprising control circuitry that operates, in said second scan mode, to control power of said visible laser light produced by said laser light source.

15. The bar code symbol reading device of claim 14, wherein said control circuitry operates, in said second scan mode, to control the duty cycle of said visible laser light to selectively enable said laser light source to produce laser light only when the light produced therefrom is directed by said scanning element onto said predetermined subset of stationary mirrors.

16. The bar code symbol reading device of claim 14, wherein said control circuitry operates, in said second scan mode, to control power of said visible laser light such that: said laser light source produces normal power laser light when the light produced therefrom is directed by said scanning element onto said predetermined subset of stationary mirrors, and said laser light source produces significantly lower power laser light when the light produced therefrom is not directed by said scanning element onto said predetermined subset of stationary mirrors.

17. The bar code symbol reading device of claim 14, wherein said scanning element comprises a rotating light directing element having a rotation cycle and said control circuitry derives timing signals synchronized to a particular interval in the rotation cycle of said rotating light directing element wherein the rotating light directing element directs light produced from the laser light source onto said predetermined subset of stationary mirrors.

18. The bar code symbol reading device of claim 17, wherein said timing signals are derived from a position sensor integrated into a rotating portion of the rotating light directing element.

19. The bar code symbol reading device of claim 17, wherein said timing signals are derived from a position indicating optical element mounted adjacent or near a perimeter of one of said stationary mirrors, such that the position indicating optical element is illuminated by light produced from said laser light source when the rotating light directing element reaches a predetermined point in its rotation.

20. The bar code symbol reading device of claim 19, wherein said position indicating optical element comprises a mirror that directs illumination incident thereon to a position indicating optical detector, which generates an electrical signal whose amplitude corresponds to the intensity of light incident thereon.

21. The bar code symbol reading device of claim 19, wherein said position indicating optical element comprises a light collecting lens that is operably coupled to a light guide to direct illumination incident on the light collecting lens to a position indicating optical detector, which generates an electrical signal whose amplitude corresponds to the intensity of light incident thereon.

22. The bar code symbol reading device of claim 21, wherein said light guide comprises a fiber optic bundle.

23. The bar code symbol reading device of claim 14, wherein said control circuitry comprises a timer integrated circuit configured for mono-stable operation.

24. The bar code symbol reading device of claim 1, wherein said laser scanning engine operates in a preprogrammed set of operational states wherethrough the laser scanning engine automatically passes during each bar code symbol reading operation.

25. The bar code symbol reading device of claim 24, wherein the preprogrammed set of operational states include a bar code presence detection state of operation and a bar code symbol reading state of operation.

26. The bar code symbol reading device of claim 25, wherein the preprogrammed set of operational states further include an object detection state of operation.

27. The bar code symbol reading device of claim 26, which further comprises an objection detection subsystem realized using either infrared (IR) signal transmission/receiving technology, or low-power non-visible laser beam signaling technology, for automatically detecting an object within an object detection field defined relative to said hand-supportable housing.

28. The bar code symbol reading device of claim 1, further comprising a set of color-encoded light sources provided on the exterior of said hand-supportable housing for sequentially generating a set of visually-perceptible state indication signals that visually indicate to a user the various states of operation, wherethrough said device automatically passes during each instance of automatic bar code symbol reading.

29. A method of transmitting bar code symbol character data to a host computer system, said method comprising the steps of:

(a) controlling a laser scanning engine disposed within a hand-supportable housing to selectively operate in one of first and second scan modes, wherein in said first scan mode, the laser scanning engine projects an omni-directional scan pattern through a light transmission aperture, repeatedly detects and decodes bar code symbols on objects passing through said omni-directional scan pattern, and produces a symbol character data string representative of each decoded bar code symbol read by said laser scanning engine, and wherein in said second scan mode the laser scanning engine projects a single line scan pattern through said light transmission aperture and repeatedly detects and decodes bar code symbols on objects passing through said single line scan pattern, and produces a symbol character data string representative of each decoded bar code symbol read by said laser scanning engine, (b) producing a data transmission activation control signal in response to the manual-actuation of a manually-actuatable data transmission switch;

(c) controlling said data transmission subsystem so that the symbol character data string, produced at substantially the same time when said data transmission control activation signal is generated, is transmitted to said host device;

(d) disabling said data transmission subsystem when said data transmission activation control signal is not being produced by said data transmission switch.

30. The method of claim 29, wherein step (c) is performed at least in part by a programmed controller.

31. The method of claim 29, wherein the laser scanning engine is selectively operated in one of said first and second scan modes in response to placement of said hand-supportable housing in a support stand that supports said hand-supportable housing.

32. The method of claim 29, further comprising the step of controlling the laser scanning engine to operate in a preprogrammed set of operational states wherethrough the laser scanning engine automatically passes during each bar code symbol reading operation.

33. The method of claim 32, wherein the preprogrammed set of operational states include a bar code presence detection state of operation and a bar code symbol reading state of operation.

34. The method of claim 33, wherein said laser scanning engine comprises:

bar code symbol presence detection means for processing scan data so as to detect the presence of said bar code symbol on said object and to automatically generate a first control signal in response to the detection of said bar code symbol; and decode processing means in said hand-supportable housing for processing scan data so as to decode said bar code symbol on said object and for automatically producing symbol character data representative of said decoded bar code symbol, and automatically generating a second control signal indicative of the production of said symbol character data.

35. The method of claim 33, wherein the preprogrammed set of operational states further include an object detection state of operation.

36. The method of claim 35, wherein the laser scanning engine utilizes either infrared (IR) signal transmission/receiving technology, or low-power non-visible laser beam signaling technology, for automatically detecting an object within an object detection field defined relative to said band-supportable housing.

37. The method of clam 35, further comprising the step of selectively operating the laser scanning engine in said bar code symbol presence detection state and said bar code symbol reading state in response to operation of the laser scanning engine in said bar code symbol object detection state.

38. The method of claim 29, wherein said laser scanning engine comprises a visible laser light source, a scanning element and at least one stationary mirror that cooperate to project said single line scan pattern through said light transmission aperture in said second scan mode.

39. The method of claim 38, wherein said light guide comprises a fiber optic bundle.

40. The method of claim 29, wherein said laser scanning engine comprises a laser light source, a scanning element and a plurality of stationary mirrors that cooperate to project said omni-directional scan pattern through said light transmission aperture in said first scan mode.

41. The method of claim 40, wherein said visible laser light source, scanning element and a predetermined subset of said plurality of stationary minors of the laser scanning engine cooperate to project said single line scan pattern through said light transmission aperture in said second scan mode.

42. The method of claim 41, further comprising the step of: in said second scan mode, controlling power of said visible laser light produced by said laser light source.

43. The method of claim 42, said second scan mode, the duty cycle of said visible laser light is controlled to selectively enable said laser light source to produce laser light only when the light produced therefrom is directed by said scanning element onto said predetermined subset of stationary mirrors.

44. The method of claim 42, wherein, in said second scan mode, power of said visible laser light is controlled such that: said laser light source produces normal power laser light when the light produced therefrom is directed by said scanning element onto said predetermined subset of stationary minors, and said laser light source produces significantly lower power laser light when the light produced therefrom is not directed by said scanning element onto said predetermined subset of stationary minors.

45. The method of claim 42, wherein said scanning element comprises a rotating light directing element having a rotation cycle, further comprising the step of deriving timing signals synchronized to a particular interval in the rotation cycle of said rotating light directing element wherein the rotating light directing element directs light produced from the laser light source onto said predetermined subset of stationary mirrors.

46. The method of claim 45, wherein said timing signals are derived from a position sensor integrated into a rotating portion of the rotating light directing element.

47. The method of claim 45, wherein said timing signals are derived from a position indicating optical element mounted adjacent or near a perimeter of one of said stationary mirrors, such that the position indicating optical element is illuminated by light produced from said laser light source when the rotating light directing element reaches a predetermined point in its rotation.

48. The method of claim 47, wherein said position indicating optical element comprises a mirror that directs illumination incident thereon to a position indicating optical detector, which generates an electrical signal whose amplitude corresponds to the intensity of light incident thereon.

49. The method of claim 47, wherein said position indicating optical element comprises a light collecting lens that is operably coupled to a light guide to direct illumination incident on the light collecting lens to a position indicating optical detector, which generates an electrical signal whose amplitude corresponds to the intensity of light incident thereon.

50. The method of claim 29, further comprising the step of: controlling a set of color-encoded light sources provided on the exterior of said hand-supportable housing to sequentially generate a set of visually-perceptible state indication signals that visually indicate to a user the various states of operation during each instance of automatic bar code symbol reading in accordance with the present invention.

* * * * *